(12) United States Patent
Babic

(10) Patent No.: US 8,589,992 B2
(45) Date of Patent: Nov. 19, 2013

(54) VIDEO WORKFLOW AUTOMATION PLATFORM FOR PUBLISHING A VIDEO FEED IN MULTIPLE FORMATS

(75) Inventor: Mio Babic, Las Vegas, NV (US)

(73) Assignee: Istreamplanet Co., Las Vegas, NV (US)

( * ) Notice: Subject to any disclaimer, the term of this patent is extended or adjusted under 35 U.S.C. 154(b) by 358 days.

(21) Appl. No.: 12/789,106

(22) Filed: May 27, 2010

(65) Prior Publication Data
US 2011/0296474 A1    Dec. 1, 2011

(51) Int. Cl.
*H04N 7/18*    (2006.01)

(52) U.S. Cl.
USPC .................. 725/87; 725/39; 725/91; 725/92; 725/93; 725/94; 725/114; 725/115; 725/116; 725/117; 709/226; 709/231

(58) Field of Classification Search
USPC ....................................... 725/87; 709/226, 231
See application file for complete search history.

(56) References Cited

U.S. PATENT DOCUMENTS

| | | | | |
|---|---|---|---|---|
| 6,407,680 B1* | 6/2002 | Lai et al. | ........................ | 341/50 |
| 6,769,127 B1* | 7/2004 | Bonomi et al. | .................. | 725/39 |
| 7,761,591 B2* | 7/2010 | Graham | ......................... | 709/233 |
| 8,010,830 B2* | 8/2011 | Hotta et al. | ................... | 714/4.11 |
| 8,059,662 B2* | 11/2011 | Moote et al. | ................... | 370/400 |
| 2003/0208638 A1* | 11/2003 | Abrams et al. | ................. | 709/328 |
| 2004/0047354 A1 | 3/2004 | Slater et al. | | |
| 2004/0117427 A1* | 6/2004 | Allen et al. | ................... | 709/200 |
| 2004/0128386 A1* | 7/2004 | Oomoto et al. | ................ | 709/226 |
| 2006/0195602 A1* | 8/2006 | Shibata et al. | ................. | 709/231 |
| 2007/0038567 A1* | 2/2007 | Allaire et al. | ................... | 705/50 |
| 2007/0050382 A1 | 3/2007 | Bugir et al. | | |
| 2007/0127667 A1* | 6/2007 | Rachamadugu | ......... | 379/201.12 |
| 2008/0098080 A1 | 4/2008 | Daigle et al. | | |
| 2008/0225698 A1* | 9/2008 | Smith et al. | ................... | 370/218 |
| 2009/0070827 A1 | 3/2009 | Barroso | | |
| 2009/0083279 A1* | 3/2009 | Hasek | ............................ | 707/10 |
| 2010/0122040 A1 | 5/2010 | Asai et al. | | |

OTHER PUBLICATIONS

"AT&T Enhances Its Digital Media Solutions Portfolio With New Features That Expand Content Management and Delivery Capabilities", *iStreamPlanet, Articles*, http://www.istreamplanet.com/NewsItem.aspx?nid=113, (Apr. 13, 2010), 2 pages.

"iStreamPlanet Announces Flash Media Server 3.5 and HTTP Dynamic Streaming Support for the Adobe Flash Platform", *iStreamPlanet, Articles*, http://www.istreamplanet.com/NewsItem.aspx?nid=115, (May 11, 2010), 2 pages.

"iStreamPlanet announces official integration of Microsoft Silverlight Rough Cut Editor (RCE) into its Video Workflow Automation Platform (VWAP)", *iStreamPlanet, Articles*, http://www.istreamplanet.com/NewsItem.aspx?nid=110, (Mar. 12, 2010), 2 pages.

"iStreamPlanet announces Release of Its Video Workflow Automation Platform", *iStreamPlanet, Articles*, http://www.istreamplanet.com/NewsItem.aspx?nid=107, (Mar. 15, 2010), 2.

(Continued)

*Primary Examiner* — Nasser Goodarzi
*Assistant Examiner* — Paul Graham
(74) *Attorney, Agent, or Firm* — Blakely Sokoloff Taylor & Zafman LLP

(57) ABSTRACT

A method and system for a video workflow automation platform (VWAP) for publishing a video feed in multiple formats is described.

27 Claims, 31 Drawing Sheets

(56) References Cited

OTHER PUBLICATIONS

"iStreamPlanet Announces Support for Microsoft Silverlight 4", *iStreamPlanet, Articles*, http://www.istreamplanet.com/NewsItem.aspx?nid=111, (Apr. 13, 2010), 2 pages.

"iStreamPlanet selected by NBC Sports to Provide Live Web Broadcast Experience of The 2010 US Open Golf Tournament at Pebble Beach and Championships 2010 at Wimbledon", *iStreamPlanet, Articles*, http://www.istreamplanet.com/NewsItem.aspx?nid=120, (Jun. 29, 2010), 2 pages.

"Record Interactive and Online Viewing for CTVOlympics.ca & RDSolympiques.ca: The Vancouver 2010 Olympic Winter Games in Review", *iStreamPlanet, Articles*, http://www.istreamplanet.com/NewsItem.aspx?nid=109, (Mar. 18, 2010), 2 pages.

"Spinnaker HD/7100", *Inlet Technologies*, www.InletHD.com., (May 2010), 2 pages.

"Spinnaker HD-X/8100", *Inlet Technologies*, www.InletHD.com., (May 2010), 2 pages.

"Spinnaker IP/6000", *Inlet Technologies*, www.InletHD.com., (May 2010), 2 pages.

Non-Final Office Action, U.S. Appl. No. 12/789,024, dated Apr. 16, 2012, 32 pages.

ISTREAMPLANET, Non-Final Office Action mailed Apr. 16, 2012 for U.S. Appl. No. 12/789,024., 31 pages.

Non-Final Office Action, U.S. Appl. No. 12/789,024, dated Apr. 25, 2013, 37 pages.

Final Office Action, U.S. Appl. No. 12/789,024, dated Aug. 27, 2012, 32 pages.

Final Office Action, U.S. Appl. No. 12/789,024, dated Sep. 11, 2013, 41 pages.

* cited by examiner

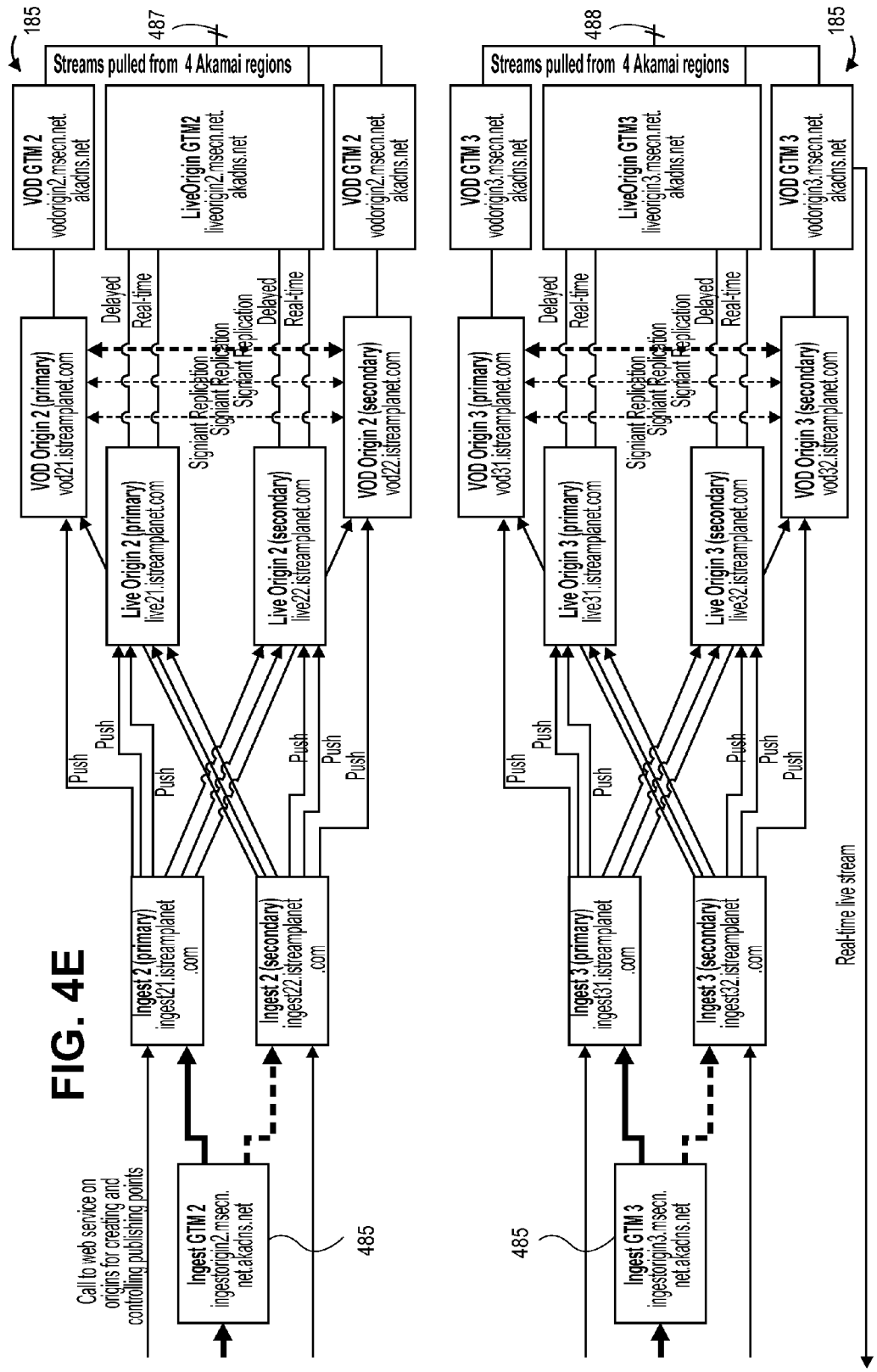

VIDEO WORKFLOW AUTOMATION PLATFORM FOR PUBLISHING A VIDEO FEED IN MULTIPLE FORMATS

RELATED APPLICATIONS

This application is related to co-pending U.S. application Ser. No. 12/789,024, entitled "Video Workflow Automation Platform," filed herewith on May 27, 2010, which is incorporated herein by reference.

TECHNICAL FIELD

Embodiments of the present invention relate to the field of delivery of media content over a network, and more specifically, to a video workflow automation platform that automatically provisions resources for acquiring, encoding, and publishing live video feeds for delivery to multiple client devices over the Internet.

BACKGROUND

The Internet is becoming a primary method for distributing media content (e.g., video and audio or audio) and other information to end users. It is currently possible to download music, video, games, and other media information to computers, cell phones, and virtually any network capable device. The percentage of people accessing the Internet for media content is growing rapidly. Audience numbers for streaming video on the web are rapidly growing, and there are a growing interest and demand for viewing video on the Internet. Streaming of data files or "streaming media" refers to technology that delivers sequential media content at a rate sufficient to present the media content to a user at the originally anticipated playback speed without significant interruption. Unlike downloaded data of a media file, streamed data may be stored in memory until the data is played back and then subsequently deleted after a specified amount of time has passed. A webcast is a media file distributed over the Internet using streaming technology to distribute a single content source to many simultaneous listeners/viewers. A webcast may either be distributed live, delayed, or on demand. Essentially, webcasting is "broadcasting" over the Internet. The term webcasting usually refers to non-interactive linear streams or events. Live webcasts enable the viewing of media content that is traditionally presented by way of conventional broadcasting (e.g., terrestrial radio and TV), but can also enable the viewing of presentations, business meetings, and seminars, for those that telecommute rather than attend. Such sites offer live broadcasting as an affordable alternative to attending physical public speaking events expanding the viewing audience to anyone that has an Internet connection. Other live webcasts may be conducted completely online independent of any offline component.

Live sporting events, such as local, national, and global events have quickly become frequent webcast subjects. Webcasting allows these events to have full audio or video coverage online. Streaming media content over the Internet has some challenges, as compared to regular broadcasts over the air, satellite, or cable. Three concerns that arise in the context of webcasting are scalability, reliability, and flexibility.

Conventionally, in order to webcast a large event, such as the Olympics, hundreds of human operators would be required to coordinate the workflow of acquiring, encoding, and publishing all of the video feeds of the events for streaming video feeds of the events over the Internet. For example, each video feed would require at least six human operators to provision the resources necessary for acquiring, encoding, and publishing, and possibly more to coordinate the starting and routing events correctly between the provisioned resources. Given the large dependencies of the workflow, one human operator may not be able to complete his or her task until receiving notification from another human operator that the corresponding dependent task has been completed. These workflow dependencies introduce a timeliness aspect to the human operators' actions.

When scaling the number of video feeds to be webcast, the number of human operators increases at least proportionally, if not greater, as the number of video feeds to be webcast increases. Also, there may be circumstances where multiple video feeds need to be started at the same moment, which may possibly require even more human operators to ensure that the multiple video feeds are all started properly according to schedule.

Regarding reliability, using human operators to coordinate the workflow is prone to human error. The reliability of any single video feed may be addressed with a team of human operators, but when scaling to multiple video feeds, the chance for detecting and remedying all human errors in a timely manner for the multiple video feeds decreases dramatically; especially when the video feeds start at the same time. Also, due to the various dependencies in the workflow, the human operators may not be able to timely perform their respective tasks in order to acquire, encoding, and publish the multiple video feeds, especially when these video feeds start at the same time. Regardless of the number of human operators used when scaling, there are too many concurrent and dependent operations to be performed in the workflow in order to ensure reliability when manually provisioning the necessary resources for multiple video feeds (as was done with the Beijing Olympic games).

Also, there are some conventional system, such as by Turner Broadcasting and Major League Baseball Advanced Media (MLBAM), that have preconfigured resources, such as where the content source is mapped to the encoder, and the encoder creates content in predefined formats and publishes the encoded video to predefined locations with no flexibility. These systems do not provide flexibility to dynamically control any of content scheduling, acquisition, routing, encoding, formatting, publishing, live-to-VOD transitioning, and content synchronizing with external sources. In addition, in order to publish the video in multiple formats, one encoder per format has to be used, which is inefficient, resource intensive, very difficult to scale, and prone to errors.

In sum, the conventional systems require manual operations, which provide challenges for scaling and which are prone to error. The conventional systems also provide no control over digital video recorder (DVR) type controls, delay, and other advanced features built into adaptive HTTP streaming technologies. These conventional systems do not provide dynamic resource management, and do not provide dynamic multi-format support.

BRIEF DESCRIPTION OF THE DRAWINGS

The invention may be best understood by referring to the following description and accompanying drawings that are used to illustrate embodiments of the invention. In the drawings:

FIGS. 4A-4E are block diagrams of another exemplary network architecture in which embodiments of the VWAP may operate.

FIG. 6 illustrates an exemplary web page presented to a human operator of the VWAP for monitoring multiple video feeds for delivery over the Internet according to one embodiment.

FIGS. 7A-7L illustrate exemplary web pages presented to a human operator of the VWAP for configuring the VWAP to automatically provision resources for acquiring, encoding, and publishing video feeds for delivery over the Internet according to one embodiment.

DETAILED DESCRIPTION

Figure 1A:
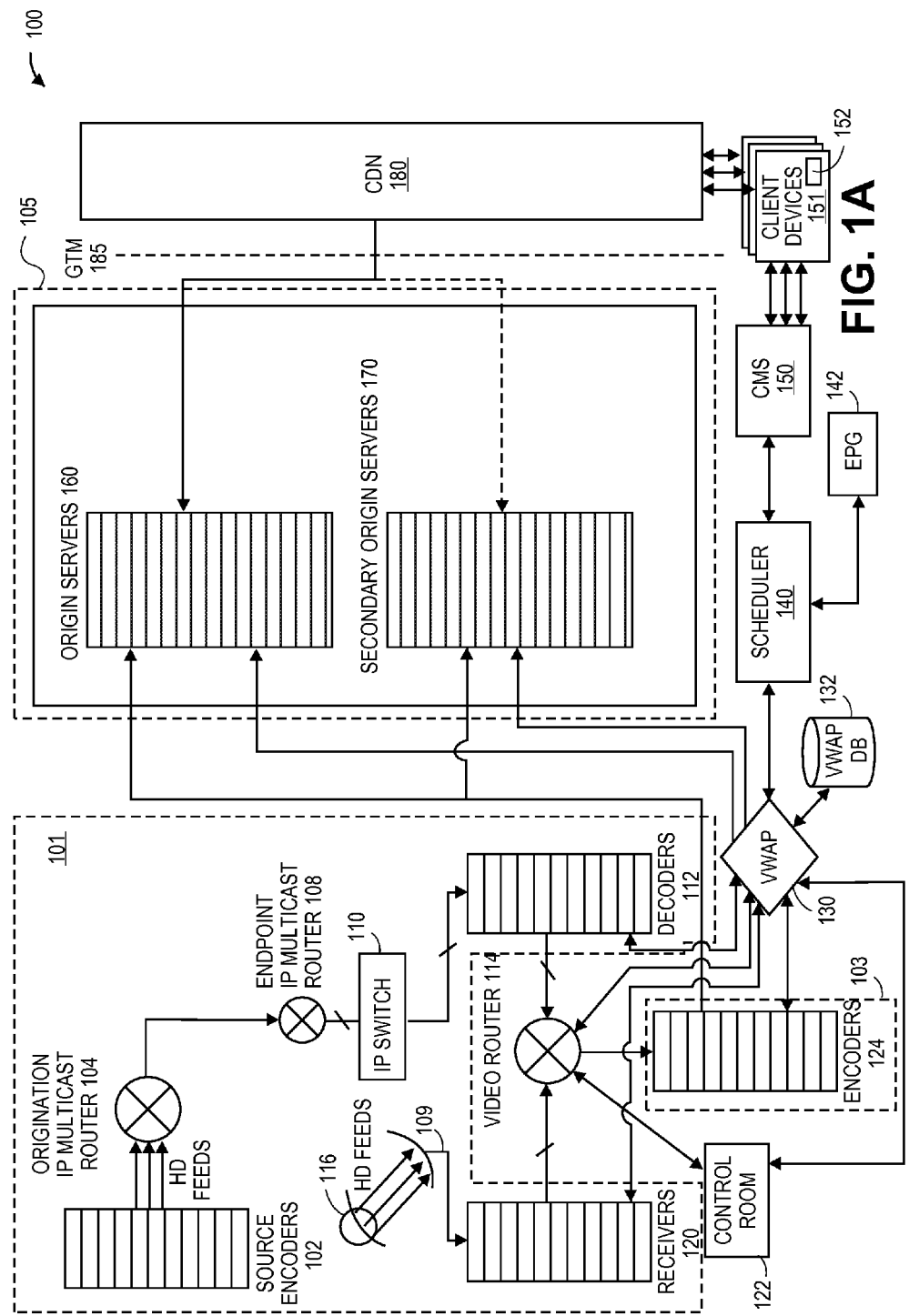
FIG. 1A is a block diagram of an exemplary network architecture in which embodiments of a video workflow automation platform (VWAP) may operate.

A method and system for a video workflow automation platform (VWAP) is described. In one embodiment, the VWAP monitors multiple resources, and, in response to a trigger, such as to start or stop one of multiple video feeds, the VWAP automatically selects a content acquisition resource to acquire the video feed, an encoding resource to encode the acquired video feed, and a publishing point to publish the encoded video feed. The VWAP communicates with a video router to provision the video router to route the acquired video from the content acquisition resource to the encoding resource. The VWAP also communicates with each of the selected resources to provide instructions for provisioning the resources to acquire, encode, and publish the video feed.

In addition, a method and system for a VWAP for publishing a video feed in multiple formats is described. Different client devices may require different formats. In one embodiment, the VWAP, in response to a trigger, such as to publish the video feed into multiple formats, automatically selects a first and a second of the multiple publishing resources that are not currently being used. The VWAP communicates with the first publishing resource to provision the first publishing resource to publish the encoded video on the Internet using a first of the multiple formats. The VWAP communicates with the second publishing resource to provision the second publishing resource to publish the same encoded video on the Internet using a second of the multiple formats. The VWAP may also perform these operations to publish the same encoded video in additional formats.

The embodiments described herein may be used to address at least the three concerns of scalability, reliability, and flexibility that arise in the context of webcasting as described herein. The embodiments described herein may be used to provide content acquisition, encoding, and publishing for ad-hoc events, as well as on-going linear programming based services, including but not limited to TV-Everywhere and Over-the-Top video services. The embodiments described herein use the VWAP to dynamically schedule, acquire, encode content, and modify output formats in a fully automated manner without human intervention.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "monitoring," "executing," "selecting," "defining," "communicating," "presenting," "provisioning," "publishing," "tracking," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

An electronic device (e.g., a computing system, a client device, a server) stores and transmits (internally and/or with other electronic devices over a network) code (composed of software instructions) and data using computer-readable media, such as non-transitory tangible computer-readable media (e.g., computer readable storage media such as magnetic disks; optical disks; read only memory; flash memory devices;) and transitory—propagating signals (e.g., electrical, optical, acoustical or other form of propagated signals—such as carrier waves, infrared signals, digital signals). In addition, such electronic devices typically include a set of one or more processors coupled to one or more other components, such as one or more non-transitory tangible machine-readable media (to store code and/or data), user input/output devices (e.g., a keyboard, a touchscreen, and/or a display), and network connections (to transmit code and/or data using transitory propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

FIG. 1 is a block diagram of an exemplary network architecture in which embodiments of a VWAP 130 may operate. The network architecture 100 may include the VWAP 130, multiple content acquisition resources 101, multiple encoding resources 103, and multiple publishing resources 105, each connected via a network, which may be a private network (e.g., a local area network (LAN), wide area network (WAN), intranet, etc.) or a public network (e.g., the Internet).

The VWAP 130 executes on a computing system, such as one or more machines including one or more server computers, gateways, or other computing systems. The VWAP 130 communicates with the VWAP database 132, as well the content acquisition resources 101, encoding resources 103, and publishing resources 105 as depicted. The VWAP 130 monitors the content acquisition resources 101, encoding resources 103, and the publishing resources 105. For example, the VWAP 130 monitors the resources by tracking the status of the respective resource, such as whether the resource is currently being used, currently failed, and currently not being used, for examples. In one embodiment, the VWAP 130 includes a content acquisition resource interface to communicate with the content acquisition resources 101, an encoding resource interface to communicate with the encoding resource 103, a publishing resource interface to communicate with the publishing resources 105, and a storage interface to communicate with a data store (e.g., VWAP database 132). In another embodiment, the VWAP 130 includes an input interface to receive input from a human operator of the VWAP 130 (e.g., FIGS. 7A-7L), a scheduler interface to communicate with a scheduler 140, and a CMS interface to communicate with the CMS 150. These interfaces may be API interfaces that can communicate instructions to the resources to configure the resources described herein. For example, the VWAP 130 can hook into the video router 114, the receivers 120, the decoders 112, the encoders 124, the origin servers 160, the secondary origin servers 170, as well as other resources described herein and other resources that could be implemented in the network architecture 200 as would be appreciated by one of ordinary skill in the art having the benefit of this disclosure.

As described in detail below, when the VWAP 130 receives a start webcasting trigger, such as from a scheduler 140 or a human operator of the VWAP 130, the VWAP 130 communicates with the respective resources to automatically allocate and provision resources to acquire, encode, and publish video feeds for delivery to multiple client devices over the Internet without human intervention or interaction, as described with respect to FIG. 2A. For example, the VWAP 130, for each video feed, selects one of the content acquisition resources 101, one of the encoding resources 103, and at least one publishing resource 105 to acquire, encoding and publish the respective video feed. This VWAP 130 performs the allocation and provisioning automatically without human intervention. The VWAP 130 can also receive stop webcasting triggers in which the VWAP 130 communicates with the respective resources to stop and release the resources without human intervention or interaction, as described below with respect to FIG. 2B.

In one embodiment, the video feeds are live video feeds. The live video feeds may be video of a live event or live performance, or may be video of a prerecorded event scheduled for playback according to a schedule. For example, the live video feed can be streamed over the Internet as it is received from the content source, such as from the publisher of the content. The live video feed may be a simulcast of the same video being broadcast over cable, satellite, or over-the-air. It should be noted that the terms "video," "raw video," "encoded video," and "video feeds," as used herein, refer to the video and corresponding audio of the particular recorded event (e.g., TV show, performance, sporting event, etc), but also may include video only. The video feed may be a webcast of a television broadcast, such as of a sporting event, a live or recorded performance, a live or recorded news report, or the like. A live event or scheduled television event in this context refers to media content that is scheduled to be played back at a particular point in time, as dictated by a schedule. The live event may also have pre-recorded content intermingled with the live media content, such as slow-motion clips of important events within the live event (e.g., replays), which are played in between the live telecast. It should be noted that the embodiments described herein may also be used for streaming video-on-demand (VOD).

In one embodiment, the multiple content acquisition resources 101 include source encoders 102, origination IP multicast router 104, end-point IP multicast router 108, IP switch 110, and decoders 112. Multicast may be one transport method type for easily transporting the data a long distance without fiber connections. Multicast also allows for error correction, as well as allowing multiple subscriptions to the same video feed without duplicating resources, which helps reduce the amount of bandwidth used. In this embodiment, the source encoders 102 each provide a video feed to the origination IP multicast router 104. The source encoders 102 encode the video feeds, such as using the H.264/MPEG-4 AVC encoding scheme (e.g., high-definition (HD) feeds), for transport over the network lines. The source encoders 102 may reside at a broadcast center (e.g., International Broadcast Center) and the end-point IP multicast router 108 may reside at another location (e.g., Las Vegas), and the origination IP multicast router 104 sends the video feeds over OC-12 network lines, for example, to an end-point IP multicast router 108. The OC-12 lines may have transmission speeds up to approximately 655 Mbps for transmitting H.264/MPEG-4 video feeds at 17.7 Mbps. Alternatively, other transmission lines may be used, as well as other encoding schemes. It should be noted that the IP multicast routers 104 and 108 are used when transmitting the video feeds over a long distance, but in other embodiments, the source encoders 102 can be coupled to the decoders 112 in other ways than with IP multicast routers and IP switches as would be appreciated by one of ordinary skill in the art having the benefit of this disclosure. In yet another embodiment, the decoders 112 may receive encoded video feeds from other video content sources.

In one embodiment where the video content source is an IP multicast source, the VWAP 130 can select one of the decoders 112 and send instructions to the selected decoder to configure the selected decoder to subscribe to the IP multicast feed from the IP multicast source. The VWAP 130 can previously receive input from a human operator of the VWAP 130 that specifies a multicast address and port of the IP multicast feed, a video identifier, and an audio identifier. This information may be stored in the VWAP database 132. When provisioning the selected decoder 112, the VWAP 130 looks up this information in the VWAP database 132 and communicates the instructions to the selected decoder 112 to configure the selected decoder 112 to subscribe to the particular IP multicast feed using the multicast address and port, video identifier, and audio identifier. In one embodiment, the VWAP 130 can instruct the decoder to subscribe to the video feed at the IP address and IP port of the end-point IP multicast router 108 using the IP switch 110. The IP switch allows multiple decoders 112 to be configured to receive the IP multicast feeds from the end-point IP multicast router 108. In one embodiment, the end-point IP multicast router 108 is an Aggregation Services Router (ASR) (e.g., Cisco ASR 1000 Series), developed by Cisco Systems of San Jose, Calif. The selected decoder 112 decodes the IP multicast feed, to which the decoder 112 is subscribed, and sends the raw, un-encoded video to a video router 114, as described in more detail below.

In another embodiment, the video content source is a satellite video feed. In this embodiment, the satellite 116 transmits HD video feeds (e.g., HD feeds encoded using the MPEG-2 encoding scheme), and the receivers 120 receive the HD feeds through one or more satellite dishes 109 coupled to the receivers 120. In one embodiment, the satellite 116 transmits the HD feeds as MPEG-2 encoded feeds. Alternatively, the video feeds from the satellite 116 may be encoded using other encoding schemes. The receivers 120 receive the HD feeds from the satellite dishes 109, decode the HD feeds, if encoded, and send the raw, un-encoded video to the video router 114. In one embodiment, the VWAP 130 selects one of the receivers 120 as the selected content acquisition resource, and communications instructions to the selected receiver to configure the selected receiver 112 to subscribe to the video feed received by the satellite dish 109 over a satellite link.

The network architecture 100 illustrates two different transport methods for receiving the raw video at the video router 114, namely through IP multicast and satellite transports. In other embodiments, other content acquisition resources can be used to acquire the video feeds from any type of video source as would be appreciated by one of ordinary skill in the art having the benefit of this disclosure. In other embodiments, other video content sources can be can be directly or indirectly coupled to the video router 114, for examples, a digital video recorder (DVR), a tape deck, a VCR, a DVD player, a Blu-ray Disc player, or other types of video sources can be coupled to the video router 114. In one embodiment, the video router 114 is the NVision router, developed by Miranda Technologies of Montreal Quebec. Alternatively, other types of video routers may be used.

The multiple encoding resources 103 may include one or more encoders 124 coupled to the video router 114. In one embodiment, the one or more encoders 124 are Inlet Technologies Spinnaker 7000. In other embodiments, the encoding resources 103 may include other types of resources for encoding the raw video feeds (also known as un-encoded video feeds) received from the video router 114. The VWAP 130 communicates with the encoding resources 103 to allocate and provision the encoding resources to receive the video feeds from the video router 114 and to output the encoded video to the provisioned publishing resources 105, described below. In one embodiment, the VWAP 130 communicates an encoding profile to the selected encoding resource 103 to encode the video feed according to the encoding profile. The encoding profile specifies how the encoding resource should encode the raw video feed. The encoding profile may specify an encoding format (e.g., IIS smooth streaming, Flash HTTP Streaming, Flash RTMP Dynamic Streaming, Apple HTTP Segmented, Windows Media, or the like), an encoding bit rates structure (e.g., encoding profiles for one or more bit rates), an image size, a video type (e.g., HD or standard definition (SD)), an audio encoding bit rate, an audio encoding format, and/or other video and audio encoding parameters. In another embodiment, the encoding profile may specify a type of platform for the client devices (e.g., desktop computer, mobile devices (e.g., the iPhone and iPad), IPTV set-top-box, networked appliance (e.g., network capable TVs), gaming systems (e.g., XBOX® game console, developed by Microsoft Corporation, or the PLAYSTATION® systems, developed by Sony), or the like. In one embodiment, the VWAP 130 generates the encoding profile based on input received at the VWAP 130, which his stored in the VWAP database 132. When the VWAP 130 communicates the encoding profile to the selected encoding resource, the encoding resource encodes the raw video according to the encoding profile.

In one embodiment, the encoding profile may include an encoder preset that the VWAP 130 can dynamically send to one of the encoders 124 based on the operator's selections, such as format, and publishing points. The encoder preset may include an encoding format, a video type (HD or SD), and a publishing point (e.g., dedicated origin server for publishing). The VWAP 130 can use the encoder presets to dynamically send configurations to any encoder without ever having to open an encoder interface to configure the encoder 124. For example, the VWAP 130 sends the encoding profile to one of the encoders 124, and the encoding profile specifies the configuration of the encoder to encode the raw video according to the specified encoding format and to route the encoded video to the specified publishing point. The VWAP 130 can also use the encoder presets to control the entire flow without having to manually build the encoding profiles or populate data on the publishing points, as described below.

The video router 114 includes multiple input and output ports. The content acquisition resources 101 are coupled to the input ports of the video router 114 and the encoding resources 103 are coupled to the output ports of the video router 114. The resources can be coupled to the video router 114 using physical cables. The VWAP 130 communicates with the video router 114 to provision the video router 114 to route the raw video from one of the content acquisition resources 101 (e.g., one of the decoders 112 or one of the receivers 120, previously selected by the VWAP 130) to the one of the encoding resources (e.g., one of the encoders 124 previously selected by the VWAP 130 as described below). In another embodiment, there may be more than one video router 114, and the VWAP 130 can be configured to select and provision the appropriate video router 114. The VWAP 130 can track the ports of the video router 114 in order to make routing connections between selected resources. The VWAP 130 can dynamically program the video router 114 to establish the routing connections when setting up the resources to acquire, encode, and publish the video and to remove the routing connections when stopping the video feed and releasing the resources. For example, the VWAP 130 can track which ports the resources (e.g., 101 and 103) are coupled in order to make routing connections at the video router 114 between the selected resources as described herein. Since VWAP 130 knows which ports are coupled to the selected resources, the VWAP 130 uses this information to dynamically route the video between the selected resources. For example, when the content acquisition resource is one of the decoders 112, the VWAP 130 accesses the port information in the VWAP 130 to determine an input port that is coupled to the selected decoder 112 and the output port that is coupled to a selected encoder 124. The VWAP 130 communicates with the video router 114 to send instructions to configure the video router 114 to route the raw video between the input and output ports. Similarly, when the content acquisition resource is one of the receivers 120, the VWAP 130 accesses the port information in the VWAP 130 to determine an input port that is coupled to the selected receiver 120 and the output port that is coupled to a selected encoder 124. The VWAP 130 communicates with the video router 114 to send instructions to configure the video router 114 to route the raw video between the input and output ports.

For example, for the Vancouver Olympics 2010, the IBC included twenty-three source encoders 102 to encode and transport twenty-three HD feeds over OC-12 lines to Las Vegas, where twenty-four decoders 112 decoded the twenty-three HD feeds. The outputs of the decoders 112 were coupled to the video router 114. In addition, five receivers 120, using the satellite dishes 109, received five HD feeds over satellite links. The output of the receivers 120 were coupled to the video router 114, and the video router 114 was coupled to thirty encoders (e.g., twenty-six encoders for NBC and six encoders for CTV). There were twenty-three encoders for the twenty-three IP multicast feeds, and five encoders for the satellite feeds, and some backup encoders (e.g., three backup encoders for NBC and one backup encoder for CTV).

In one embodiment, the publishing resources 105 include one or more origin servers 160 to publish the encoded video on the Internet. In one embodiment, the VWAP 130 can select a set of one or more origin servers 160 and create one or more publishing points at the set of origin servers 160. In one embodiment, the origin server 160 is a single machine. In another embodiment, the origin server 160 represents one or more servers that can be executed on one or more machines or on one or more virtual machines. In another embodiment, the origin servers 160 can be implemented in a cloud-computing environment of one or more machines. In another embodiment, the publishing resources 105 include the origin servers 160 and one or more secondary origin servers 170 for failover redundancy. For example, the VWAP 130 can detect when one of the origin servers 160 fails and can automatically switch to the corresponding secondary origin server 170. The failover redundancy may be optional. In another embodiment, the origin servers 160 (and 170) may have web services installed on each of the origin servers that perform publication point control and management. Alternatively, other architectures for the origin servers can be used as would be appreciated by one of ordinary skill in the art having the benefit of this disclosure, such as the embodiment depicted in FIG. 1B. The VWAP 130 may allocate one of the origin servers 160 to receive the encoded video from one of the encoders 124 previously selected by the VWAP 130. The VWAP 130 also communicates with the selected encoder 124 to provision the selected encoder 124 to output the encoded video to the allocated origin server 160. Similarly, the VWAP 130 can communicate with the selected encoder 124 to provision the selected encoder 124 to output the same encoded video to a corresponding secondary origin server 170. In one embodiment, the VWAP 130 communications instructions to the origin servers 160 to configure the origin server 160 to obtain the encoded video from the selected encoder 124. In another embodiment, the VWAP 130 sends instructions to the selected encoder 124 to configure the selected encoder 124 to output the encoded video to the origin server 160. In another embodiment, a global traffic manager (GTM) is used to manage the routing of the encoded video from the encoders 124 to the origin content servers 160 (and to the secondary origin servers 170). For example, the GTM, or other similar systems, can be used to reroute video from the primary origin server to a secondary origin server should the primary origin server (or ingest server of a server pod) become nonresponsive.

Figure 1B:
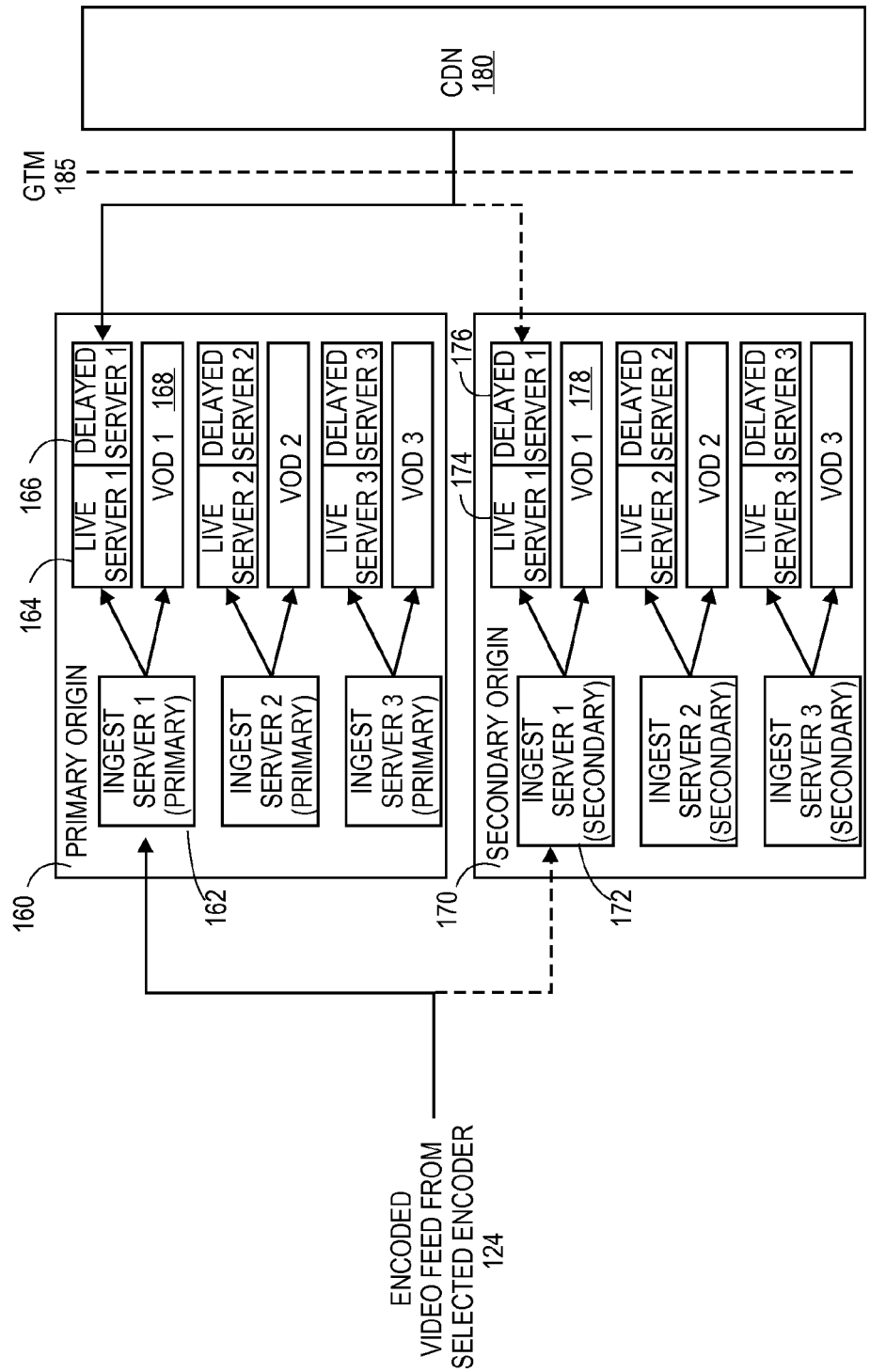
FIG. 1B is a block diagram of an exemplary architecture of the origin servers and secondary origin servers of FIG. 1A according to one embodiment.

FIG. 1B is a block diagram of an exemplary architecture of the origin servers 160 and secondary origin servers 170 of FIG. 1A according to one embodiment. The origin servers 160 includes one or more server pods, each including an ingest server 162, a live server 164, a delayed server 166, and a VOD server 168. FIG. 1B illustrates three server pods for the primary origin servers 160 and three server pods for the secondary origin servers 170. The VWAP 130 provisions the ingest server 162 to receive the encoded video from one of the encoders 124. In one embodiment, the VWAP 130 sends instructions to the ingest server 162 to configure the ingest server 162 to obtain the encoded video from the selected encoder 124. In another embodiment, the VWAP 130 sends instructions to the selected encoder 124 to configure the selected encoder 124 to output the encoded video to the ingest server 162. Alternatively, a GTM may be used between the encoders 124 and the ingest servers. The ingest server 162 routes the encoded video to the live server 164, the delayed server 166, and the VOD server 168. The live server 164 publishes one or more live video streams (e.g., real time streams) of the encoded video. A delayed server 166 can publish one or more delayed video streams that are separate from the live video streams. The video streams can be delayed to allow for advertisement insertion, or editorial purposes for example. For examples, the delayed server 166 can delay publishing the live streams by thirty seconds to allow advertisements to be inserted into the delayed streams or allow the streams to be monitored for and/or edited to remove inappropriate content. Alternatively, the advertisement can be inserted before the encoders 124 encode the video feeds. The live server 164 and delayed server 166 may reside on a single computing device, or may reside on separate computing devices. Similarly, the ingest server 162 can reside on the same computing device or different computing devices as the live server 164, the delayed server 166, and/or the VOD server 168. The VOD server 168 receives the same encoded video as the live server 162, but the VOD server 168 is configured to process the encoded video for presenting the video later on demand and not according to a schedule (i.e., to archive it for on-demand playback). For example, in the context of adaptive streaming, the number of accesses to the live or delayed streams can be larger than the number of VOD streams accesses. The computing device hosting the live server 162 and/or the delayed server 164 may include hardware resources for processing the video quickly for streaming the live video feed according to a schedule, for example, the schedule imposed by the scheduler 140, and may include less hardware resources for storing the video for later delivery. In comparison, the computing device hosting the VOD server 168 may include less hardware resources for processing the video quickly for live streaming, but more hardware resources used for storing the video for streaming the VOD stream for later delivery, since the VOD stream is not tied to the schedule.

In one embodiment, the VWAP 130 communicates with each of the ingest server 162, the live server 164, delayed server 166, and the VOD server 168 to provision the respective resource to create a publishing point. The VWAP 130 may also monitor each of these resources to track whether these resources are currently being used, not currently being used, currently failed, or the like. In one embodiment, upon failover of the live server 164, the VWAP 130 can instruct the ingest server 162 to route the video to another live server that is not currently being used. This may be done in addition to, or in place of, the failover redundancy of the secondary origin servers 170. The secondary origin server 170 may include the ingest server 172 that receives the same encoded video as the ingest server 162 and routes the encoded video to the live server 174 and the VOD server 178. A delayed server 176 can receive the live video streams from the ingest server 172 and publish the delayed video streams that are separate from the live video streams of the live server 174. The origin servers' configuration may be a 1:1 redundancy configuration, or other configurations as would be appreciated by one of ordinary skill in the art having the benefit of this disclosure. However, unlike traditional 1:1 redundancy configurations, the encoding resources do not need to be duplicated, as described herein. For example, one of the encoders 124 can output the encoded video to two publishing resources to publish the video at two or more publishing points in two or more formats.

In another embodiment, the VWAP 130 can communicate with the live server 164, delayed server 166, and VOD servers 168 in order to perform a live-to-VOD transition. For example, the live server 164 may fail or may be stopped, and the VWAP 130 can instruct the live server 164 to stop, and issue a redirecting file (e.g., created by the VWAP 130), such as an HTTP .302 file, for the live-to-VOD transition. The redirecting file may be one of the HTTP response status codes (e.g., .302 file) that temporarily or permanently redirect the CDN 180 to another URL (e.g., the corresponding URL for the VOD feed). The .302 file may include a pointer to the location where the video files have been moved. The VWAP 130 can instruct the live server 164 to move the video files to the corresponding file locations of the VOD stream being processed by the VOD server 168. Not only can the VWAP 130 instruct the live server 164 to move the files to the designated location, but can also update the content management system (CMS) 150 with the new URLs to where these files have been moved. The CMS 150 is described in more detail below, but, in this context, the CMS 150 can provide the updated URLs to the media players 152, executing on the client devices 151, to indicate where the content can be requested. The VWAP 130 can perform this update transparently to the viewers.

Referring back to FIG. 1A, in one embodiment, the origin servers 160 are coupled to a content delivery network (CDN) 180. A CDN is a system of computers networked together across the Internet that cooperates transparently to deliver content, and may include, for example, one or more origin content servers, web servers, cache servers, edge servers, etc. Typically, the CDN 180 is configured in a hierarchy so that a client device requests the data from an edge cache, for example, and, if the edge cache does not contain the requested data, the request is sent to a parent cache, and so on up to the origin content server. The CDN 180 may also include interconnected computer networks or nodes to deliver the media content. Some examples of CDNs would be CDNs developed by Akamai Technologies, Level3 Communications, or Limelight Networks. Alternatively, other types of CDNs may be used. In other embodiments, the origin servers 160 (and optional secondary origin servers 170) may deliver the encoded video to the client devices 151 using other configurations as would be appreciated by one of ordinary skill in the art having the benefit of this disclosure. For example, the client devices 151 may request and receive content from any of the multiple web servers, edge caches, or proxy cache servers. Each of the client devices 151 executes a media player 152 to request, receiver, and present the video feed to a user of the media player. The media player 152 may be a piece of software that requests and plays the media content (e.g., displays video and plays audio), and may be a standalone software application, a web browser plug-in, a combination of browser plug-in and supporting web page logic, or the like.

In one embodiment, the origin servers 160, and the optional secondary servers 170, are coupled to the CDN 180 using a GTM 185. The GTM 185 continuously monitors the output of the origin servers 160 to see if this publishing point is available for transmitting the encoded video over the CDN 180; and, if not, the GTM 185 goes to the corresponding secondary origin server 170 to check if the secondary publishing point is available for transmitting the encoded video over the CDN 180.

In the depicted embodiment, the network architecture 100 includes a CMS 150. The CMS 150 is a publishing system that manages the video feeds. The CMS 150 may use a database that allows a publisher to generate and modify timelines to schedule playback of the video feeds. The CMS 150 can push these updates to the media players 152 or the media player 152 can pull these updates from the CMS 150, for example, by periodically checking for updates at the CMS 150. These updates may be cached and delivered through the CDN 180. For example, the CMS 150 can provide to the media players 152 of the client devices 151 metadata that defines a playlist for the viewer, indicating when the video feeds can be played. For example, the timeline may specify a starting time of one or more video feeds, and a current duration of the video feeds to allow playback of the video feeds according to the schedule. In the example above, the VWAP 130 updates the CMS 150 with the publishing points of the video feeds and the start and stop times of the video feeds, as scheduled by the scheduler 140. The scheduler 140 is executed on one or more machines. In one embodiment, the scheduler 140 is integrated with the CMS 150. In another embodiment, the scheduler 140 and CMS 150 are separate systems. In one embodiment, the scheduler 140 is integrated on the same computing system as the VWAP 130. Alternatively, the scheduler 140 and VWAP 130 can be integrated on separate computing systems. In other embodiments, the CMS 150 may receive other information, such as any of the following: the encryption keys; availability information that indicates when the video feeds are available for delivery by the CDN 180; the format of the video feeds, the imaging size, the type of video (e.g., HD or SD), air date of the content, title, actresses, actors, a start index, an end index, proprietary publisher data, content duration, episode or program name, publisher; available tools for the end-user navigational environment, such as available menus, thumbnails, sidebars, advertising, fast-forward, rewind, pause, and play, or the like; or bit-rate values, including frame size, audio channel information, codecs, sample rate, and frame parser information.

In other embodiments, the network architecture 100 may include other systems, such as directory servers, digital rights management servers, messaging servers, statistic servers, billing systems, or the like.

In one embodiment, the VWAP 130 provisions the origin servers 160 to publish the encoded video in a single format received from one of the encoders 124. For example, one of the encoders 124 outputs the encoded video to the publishing point at the provisioned origin server 160. In one embodiment, the encoder 124 encodes the video according to the selected format (e.g., IIS smooth streaming, Flash HTTP Streaming, Flash RTMP Dynamic Streaming, Apple HTTP Segmented, Windows Media, or the like), outputs the encoded video to the selected publishing point(s). In this embodiment, there may be one encoder for each supported format as done conventionally. However, as described herein, the embodiments may share encoding resources. In one of these embodiments, the encoder 124 encodes the video according to one format that can be published according to different formats by multiple publishing points. For example, the VWAP 130 can provision the encoder 124 to encode the raw video into H.264/MPEG-4 video, and routes the same encoded video to multiple publishing points, each publishing point to deliver the encoded video according to a different format (e.g., IIS smooth streaming, Flash HTTP Streaming, Flash RTMP Dynamic Streaming, Apple HTTP Segmented, Windows Media, or the like). For example, in one embodiment, one of the origin servers 160 is a Smooth Streaming Server (IIS server) that can receive the encoded video (e.g., H.264/MPEG-4 video), such as six bit rate streams, and prepare the encoded video for delivery according to the IIS Smooth Streaming format, while another one of the origin servers 160 is a Flash Media Server (FSM) that can receive the same encoded video and prepare the encoded video for delivery according to one of the Flash HTTP or Flash RTMP Dynamic Streaming formats. The VWAP 130 can provision these servers to receive the same encoded video and package the same encoded video according to the different formats, such as, for example, by wrapping the video with the appropriate headers or other metadata to allow the video to be streamed according to the respective format. In other embodiments, other types of formats may be used, such as Apple HTTP Segmented, Windows Media, or the like.

In another embodiment, the VWAP 130 can provision one of the origin servers 160 to transcode the encoded video into a specified format (e.g., Apple HTTP Segmented). Transcoding is the direct digital-to-digital conversion of one encoding to another. This may be done in cases where the client device does not support the format or has limited storage capacity that mandates reduced file size, or to convert incompatible data to another supported format. In this embodiment, the origin server 160 receives the encoded video, such as H.264/MPEG-4 video, and transcodes the H.264/MPEG-4 video into the specified format for delivery over the Internet. It should be noted that when transcoding, there may be a loss in quality of the video. However, the loss of quality may be acceptable to allow the video to be streaming in the specified format, such as for devices that only support this particular format (e.g., Apple HTTP segmented). In another embodiment, the VWAP 130 can provision one of the origin servers 160 to transcode the H.264/MPEG-4 video into the specified format (e.g., Apple HTTP segmented) and to prepare the same video for delivery according to a different format (e.g., IIS Smooth Streaming). Alternatively, the VWAP 130 can provision the origin servers 160 in other manners as would be appreciated by one of ordinary skill in the art having the benefit of this disclosure.

Figure 1C:
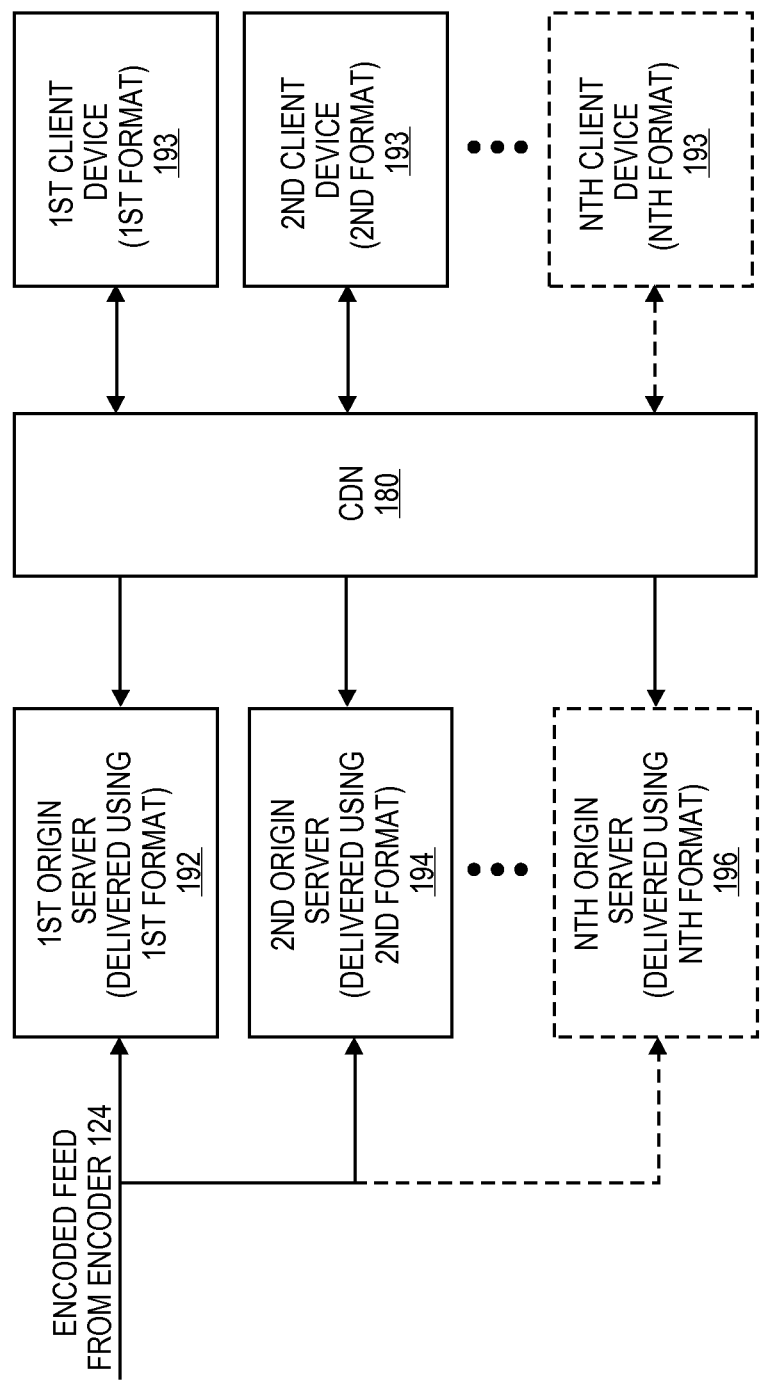
FIG. 1C is a block diagram of an exemplary architecture of provisioned origin servers to receive the same encoded video and to deliver the encoded video according to different formats according to one embodiment.

FIG. 1C is a block diagram of an exemplary architecture of provisioned origin servers to receive the same encoded video and to deliver the encoded video according to different formats according to one embodiment. In this embodiment, the first origin server 192 receives the encoded video feed from one of the encoders 124, and the second origin server 194 receives the same encoded video feed from the same encoder 124. The VWAP 130 communicates with the first origin server 192 to provision the first origin server 192 to package the encoded video feed in a first format for delivery over the Internet at a first publishing point. The VWAP 130 communicates with the second origin server 194 to provision the second origin server 194 to package the same encoded video feed in a second format for delivery over the Internet at a second publishing point. FIG. 1C also illustrates that the VWAP 130 can communicate with up to an Nth origin server 196 to receive and package the same video feed into different formats, where N is an integer greater than one. The CDN 180 monitors the outputs of the origin servers 192-196 and delivers the different format encodings over the Internet to the client devices 193, 195, and 197. The client devices 193-197 may require different ones of the different formats. These embodiments support multiple different platforms and multiple different formats. The VWAP 130 allows the video feed to be encoded once, and delivered across multiple formats, such as the following four formats—Flash Dynamic, Flash HTTP Streaming, IIS Smooth Streaming and Apple HTTP Segmented, to multiple client devices, such as desktop computers, mobile devices, gaming systems, or the like.

In one embodiment, the origin server 160 transcodes the encoded video received from the encoder into a second format (e.g., Apple HTTP Segmented Streaming) without undergoing another complete decoding and encoding process. In another embodiment, the origin server 160 transcodes the encoded video received from the encoder 124 into the second format using an intermediate uncompressed format. Conventionally, separate encoders were required to encode each of these formats, which increased the number of resources required to accommodate all formats. These embodiments allow the reduction in encoding resources, while allowing the publishing resources to be automatically provisioned to publish the same video into the different formats for delivery to different types of client devices that support different formats.

It should be noted that although in some embodiments, the VWAP 130 provisions the origin servers 160 to publish the video into the different formats, in other embodiments, the VWAP 130 can provision the encoders 124 to encode the video feeds according to the specified formats before sending to the origin servers 160. In another embodiment, the VWAP 130 can allow the same video feed, acquired by one of the content acquisition resources 101, to be encoded by two different encoding resources 103. In this embodiment, the VWAP 130 automatically selects a second one of the encoding resources 103 and communicates with the second encoding resource 103 to provision the resource to encode the raw video according to a second format that is different than an encoding format of the first selected encoding resource that is encoding the same video acquired by the same content acquisition resource 101. The VWAP 130 can communicate with the video router to provision the video router to route the same raw video to the second encoding resource 103. The VWAP 130 also selects a second publishing resource that is not currently being used, communicates with the second publishing resource to publish the encoded video on the Internet, and communicates with the selected resource to provision it to route the encoded video (in the second format) to the selected publishing resource. Alternatively, other configurations may be used to reuse resources as would be appreciated by one of ordinary skill in the art having the benefit of this disclosure.

It should be noted that although various embodiments of the operations of the VWAP 130 are described in the context of receiving a single start or stop trigger from the scheduler 140, in other embodiments, the VWAP 130 can accommodate multiple triggers. In one embodiment, the video feed can be set in schedule to be automatically started and/or stopped, or set to manually started or stopped by the human operator. In another embodiment, the VWAP 130 receives the start and stop triggers from a human operator of the VWAP 130. In one embodiment, the VWAP 130 receives multiple start webcast triggers from the scheduler 140. Each start webcast trigger instructs the VWAP 130 to provision resources to acquire, encode, and publish one of the video feeds for delivery to multiple client devices over the Internet. The scheduler 140 maintains a schedule of multiple video feeds, and some of the video feeds may start approximately at the same time.

As described above, the VWAP 130 monitors the resources, and in response to the start webcast triggers, the VWAP 130 automatically allocates and provisions one of the acquisition resources that is not currently being used, automatically allocates one of the encoding resources that is not currently being used, automatically provisions a video router to route raw video of the one video feed between the one acquisition resource and the one encoding resource. The VWAP 130 also automatically provisions a publishing point at one of the publishing resource, and automatically provisions the encoding resource to output encoded video of the video feed to the provisioned publishing point to publish the encoded video on the Internet. In one embodiment, the VWAP 130 automatically allocates and provisions the acquisition resource, the one encoding resource, and the publishing point at substantially the same time. However, the VWAP 130 waits for confirmation of completion of provisioning the one acquisition resource, the one encoding resource, the one publishing resource before completing said automatically provisioning the video router and the one encoding resources. The VWAP 130 instructs the provisioned encoding resource to start encoding the raw video, and the VWAP 130 automatically verifies that the publishing point is receiving the encoding video from the encoding resource and transmitting the encoded video over the Internet (such as to the CDN 180). If the publishing point is receiving and transmitting, the VWAP 130 extracts from the publishing points (or from the encoding resource) an actual start time of the video feed, such as when the encoding resource starts encoding the raw video or when the first of the encoded video (video and audio information) is received by the publishing point, and sends a successful start and the actual start time to the scheduler 140. For example, the VWAP 130 may post the successful start and actual start time to the VWAP database 132 that then updates the scheduler 140 and/or the CMS 150. Alternatively, the VWAP 130 can send this information to the scheduler 140 using other methods as would be appreciated by one of ordinary skill in the art having the benefit of this disclosure. If the publishing point is not receiving and transmitting, the VWAP 130 automatically repeats the provisioning of the publishing point and encoding resource until the provisioned publishing point is receiving and transmitting the encoded video. The VWAP 130 can retry the same resource, and, after a specified number of attempts, the VWAP 130 can provision a failover resource (a second resource that is not currently being used) for each type of verification being performed by the VWAP 130. In another embodiment, the VWAP 130 automatically verifies that the raw video is routed properly, and, if not, automatically repeats the process until properly routed. The VWAP 130 can retry the same resource, and after a specified number of attempts, the VWAP 130 can provision one or more failover resources that are not currently being used.

In one embodiment, the specified number of attempts is a fixed value. In another embodiment, the specified number of attempts is configurable, such as allowing the operator of the VWAP 130 to change this as a setting (e.g., set to five attempts) in the VWAP database 132. If the VWAP 130 fails to provision a resource the set number of times, the VWAP 130 writes the provisioning failure to the VWAP database 132, and the scheduler 140 can pull it from the VWAP database 132 to display the provisioning failure visually in the scheduler's user interface (e.g., web page of FIG. 6) so the operator becomes aware of the provisioning failure. In another embodiment, the VWAP 130 can generate an email notification to a specified email address on every failure or issue VWAP 130 may encounter.

In another embodiment, the network architecture 110 includes monitoring equipment in the control room 122 that can monitor all incoming video feeds, as well as monitoring the operations of the video router 114, such as whether the video has been acquired by the decoders 112 or the receives 120, whether the video router 114 is properly routing between appropriate resources. The monitoring equipment may also monitor the raw video feeds being received at the video router 114, as well as the encoded video feeds being output by the encoders 124. In one embodiment, the VWAP 130 communicates with the monitoring equipment in the control room 122 to collect monitored information, as well as to verify correct operation, such as whether the video has been acquired, whether publishing points have been provisioned, whether a particular encoder has been started, and whether publishing points are receiving and transmitting video and audio. In one embodiment, the monitoring equipment and the VWAP 130 are integrated into the same system, such as on one or more servers. In other embodiment, the VWAP 130 can monitor the resources without the use of the monitoring equipment of the control room 122. The VWAP 130 can also present a user interface to a human operator of the VWAP 130 and/or the scheduler 140 to configure parameters of the VWAP 130, as well as to input information into the VWAP database 132. In one embodiment, the user interface is a web-based user interface, such as those illustrated in FIG. 6 and FIGS. 7A-7L.

Figure 6:
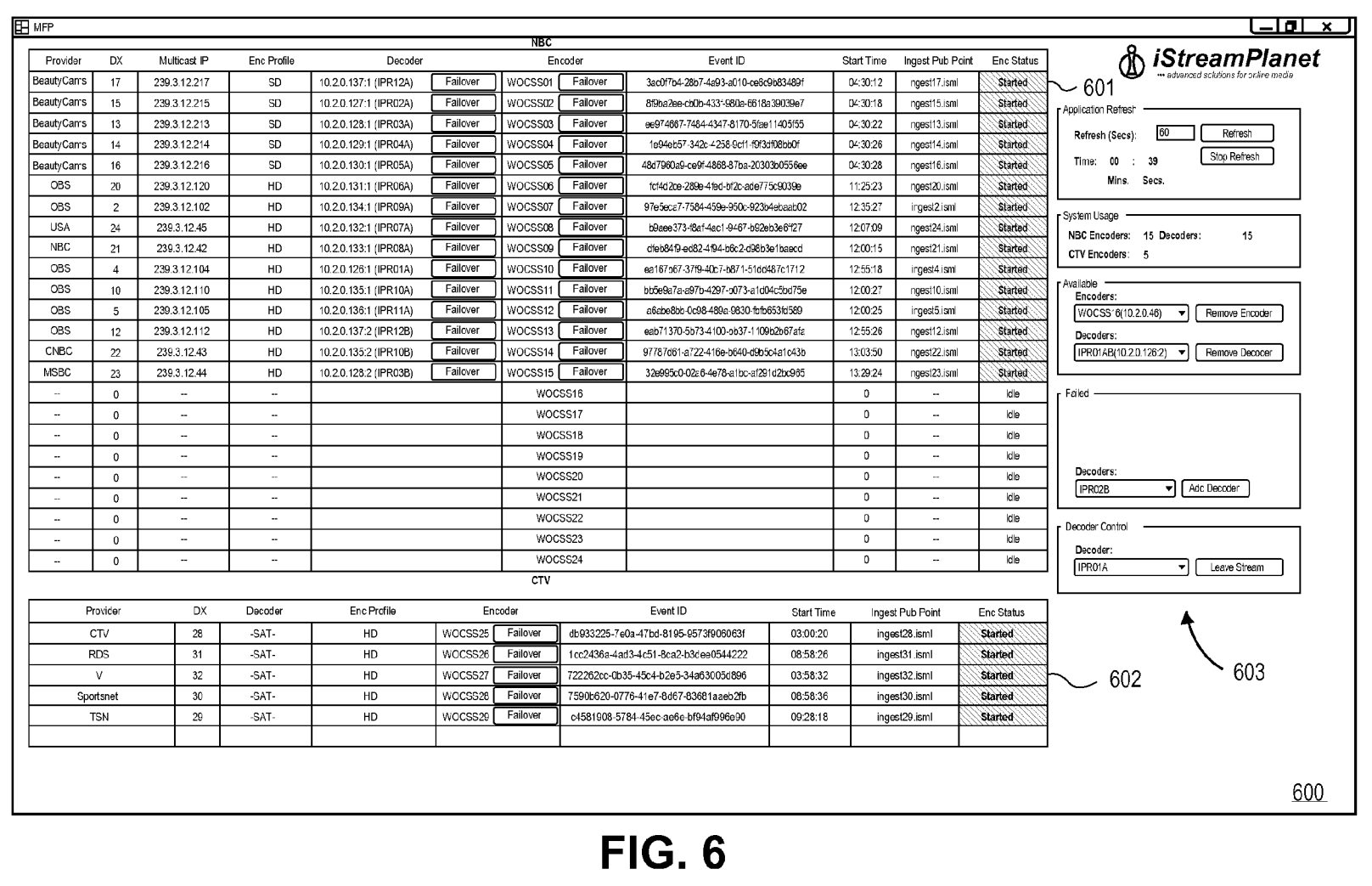

FIG. 6 illustrates an exemplary web page 600 presented to a human operator of the VWAP 130 for monitoring multiple video feeds for delivery over the Internet according to one embodiment. As depicted in FIG. 6, the web page includes a first table 601 (representing the twenty-three possible multicast feeds) having an entry for each video feed (rows). Each video feed indicates the provider (e.g., NBC, CNBC, etc), the channel (DX), a multicast IP address, an encoding profile (e.g., HD and SD), the selected decoder, the selected encoder (twenty-three for each of the twenty-three feeds and one backup), the event ID, the start time, the publishing point (e.g., ingest publishing point), and the encoding status (e.g., starting, started, stopped, idle, failed). The web page 600 also includes a second table 602 (representing the five possible satellite feeds) having an entry for each video feed (rows). Each video feed indicates the provider (e.g., CTV, RDS, V, etc), the channel (DX), the receiver (Satellite), an encoding profile (e.g., HD and SD), the selected encoder (five for each of the five feeds and one backup), the event ID, the start time, the publishing point (e.g., ingest publishing point), and the encoding status (e.g., starting, started, stopped, idle, failed). In one embodiment, the VWAP 130 can assign a number of encoders 124 to the customer (e.g., NBC) to match a number of channels they have plus any failover encoder(s), and the VWAP 130 can automatically send the encoder profile to the selected encoder based on availability and routes the raw video from one of the content acquisition resource 101 (e.g., decoder/receiver) to the selected encoder. The content acquisition resource 101 can be shared among different customers. The web page 600 also provide some additional controls and information 603, such as for application refresh settings, system usage statistics, available encoders, failed resources, and decoder controls. The web page illustrated in FIG. 6 is one example of a web page used for monitoring the operations of the resources. Alternatively, other styles, content, and controls can be used for the user interface as would be appreciated by one of ordinary skill in the art having the benefit of this disclosure. In one embodiment, the web-based user interface depicted in FIG. 6 is the user interface of the VWAP 130. In another embodiment, the web-based user interface in FIG. 6 is a user interface of the scheduler 140.

Figure 7A:
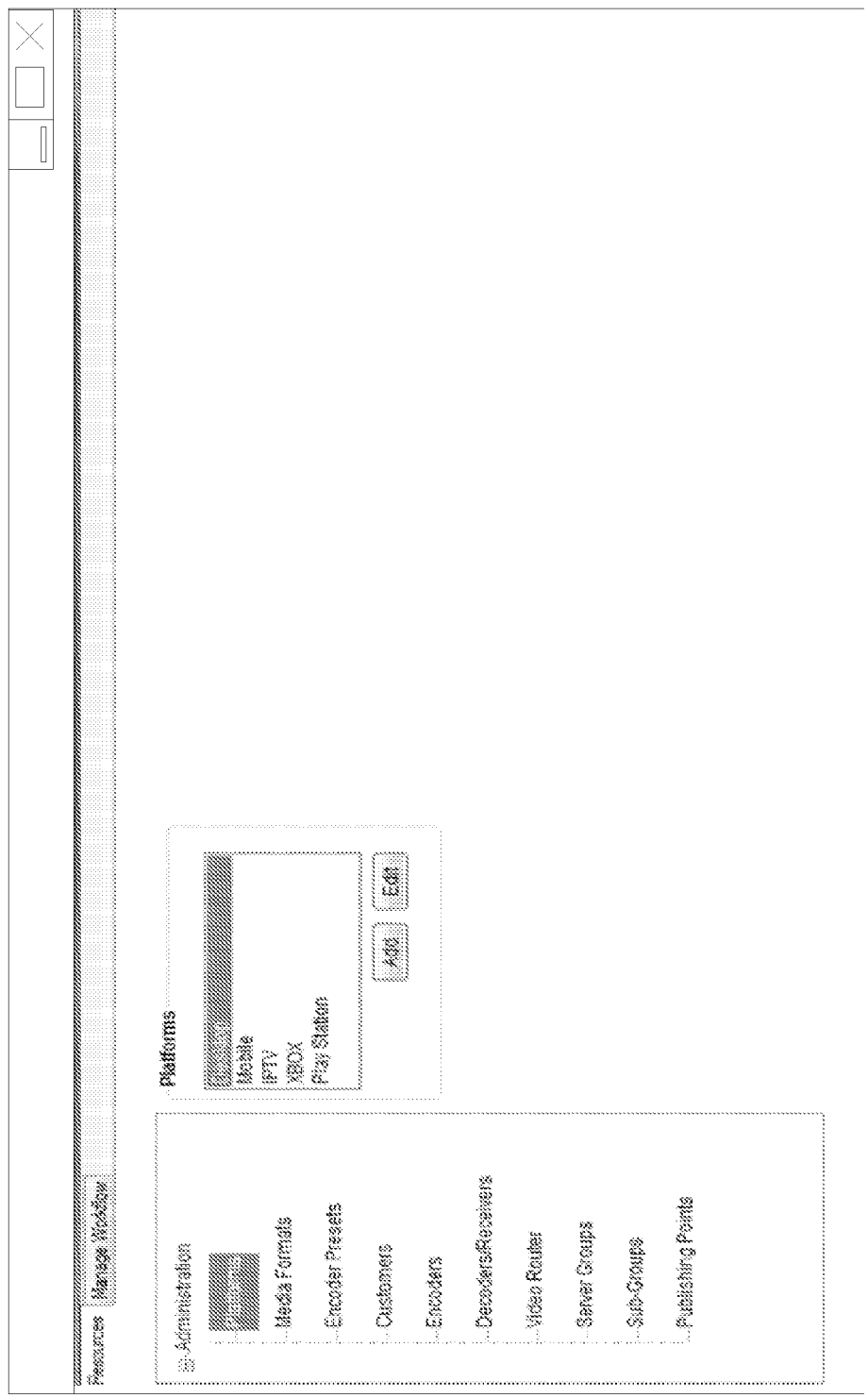
Figure 7B:
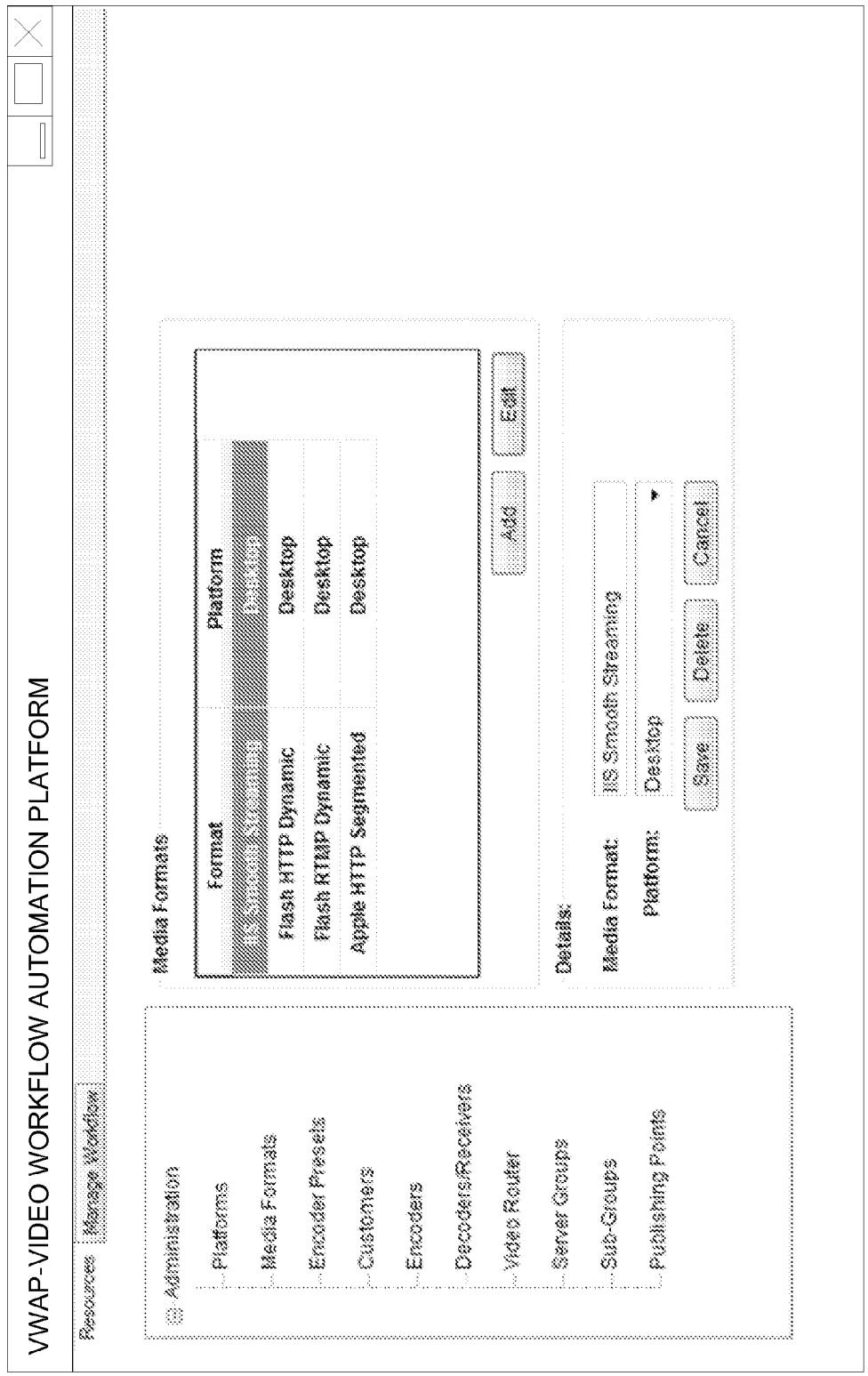
Figure 7C:
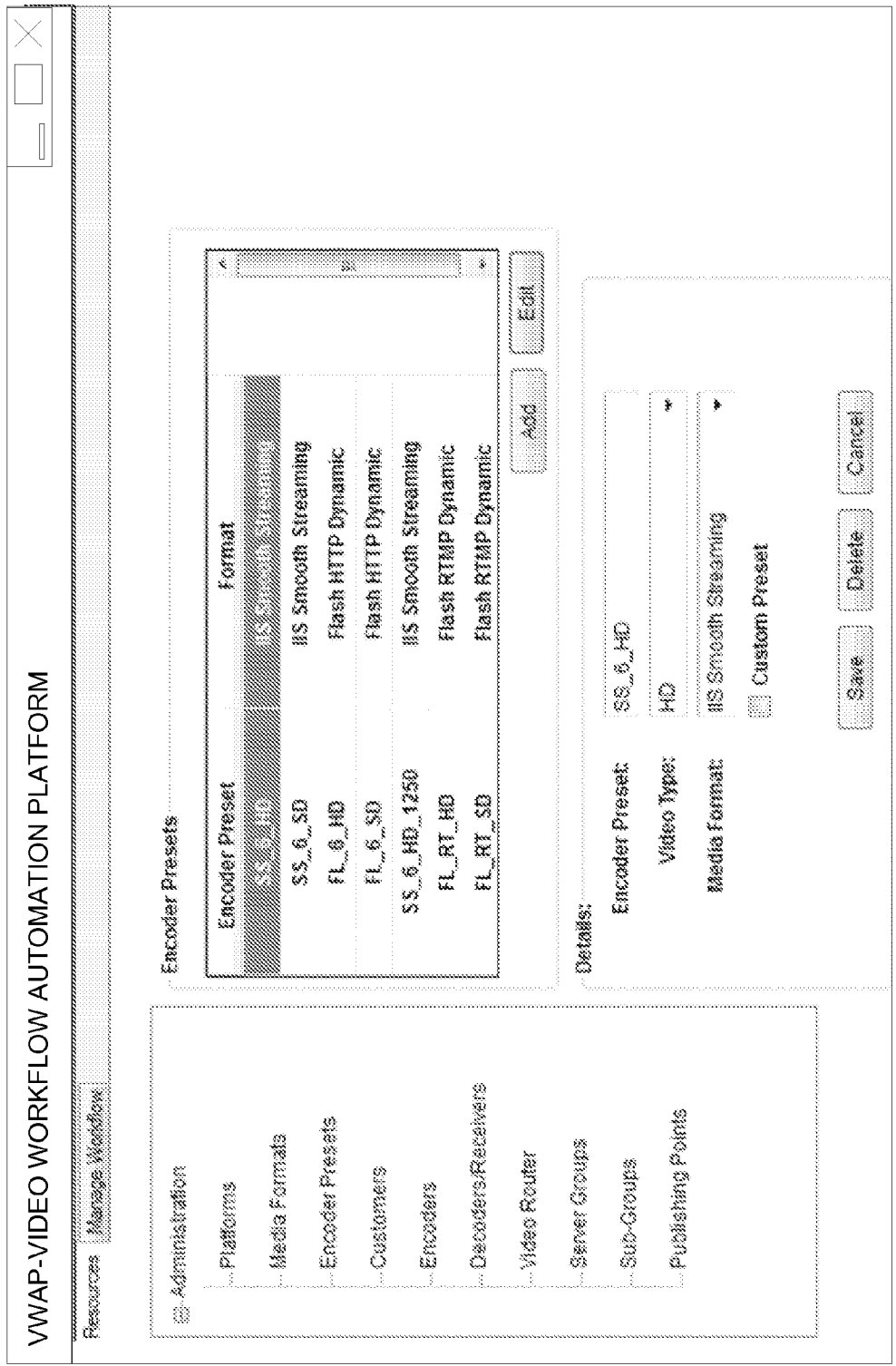
Figure 7D:
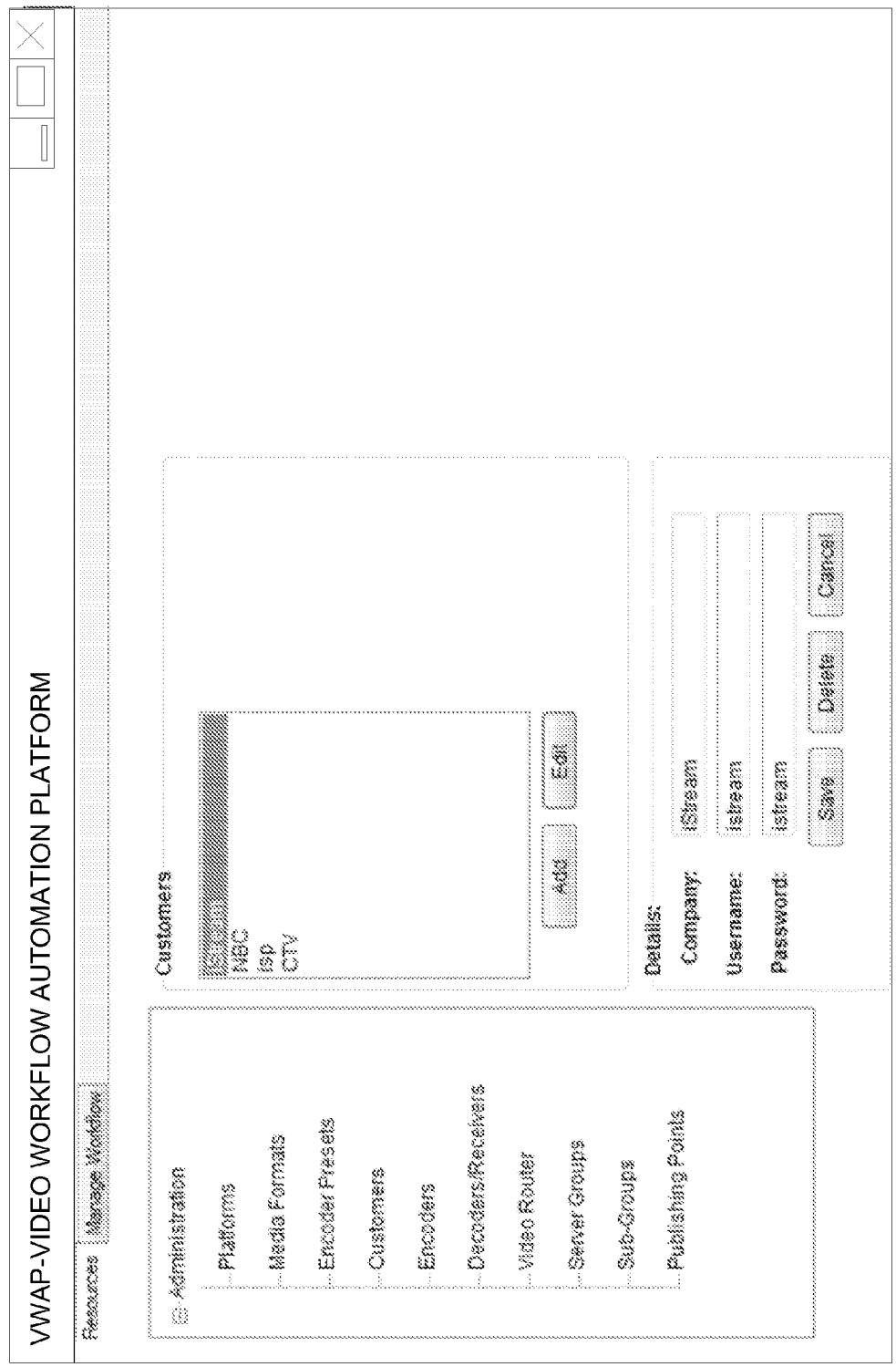
Figure 7E:
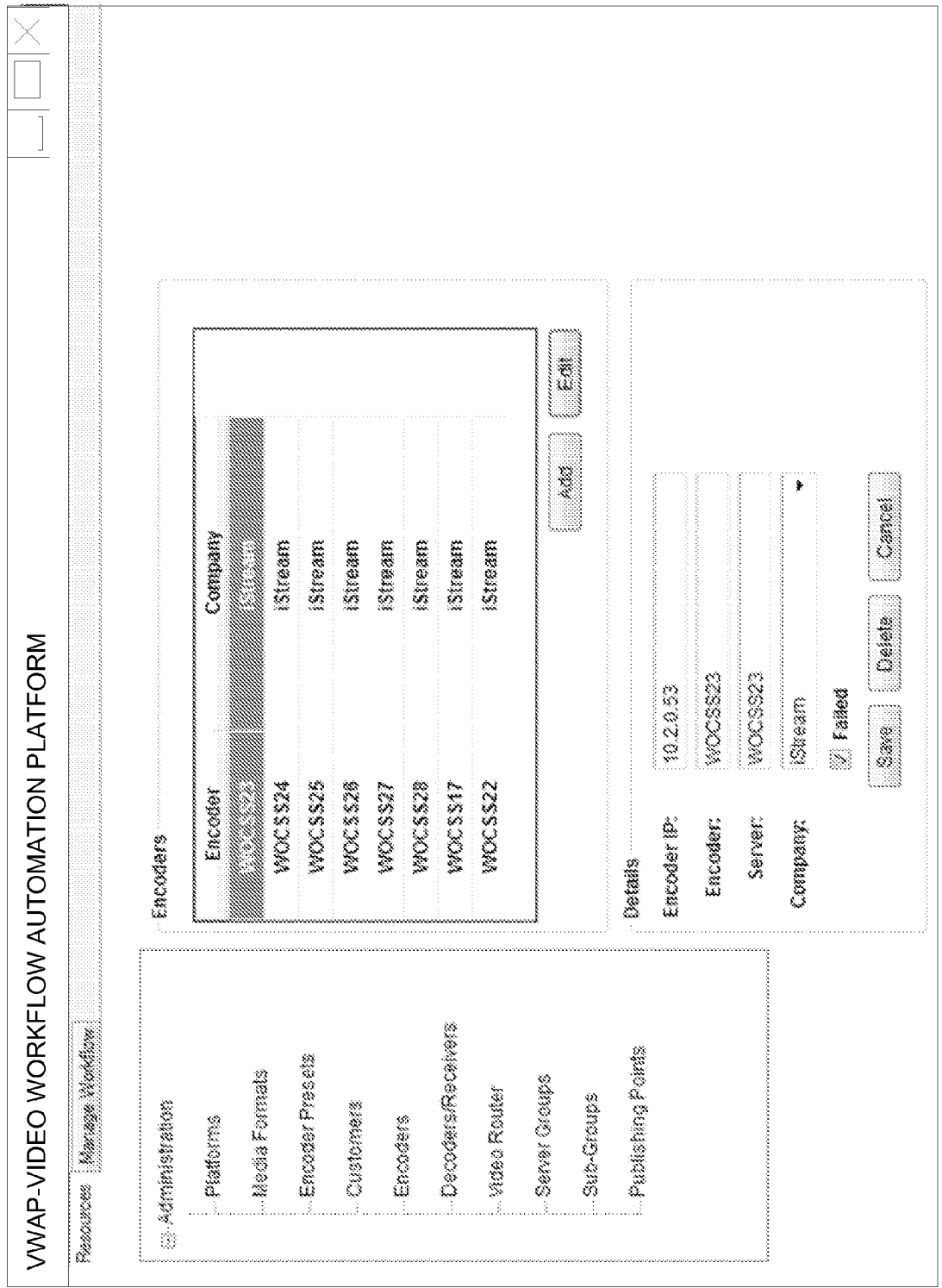
Figure 7F:
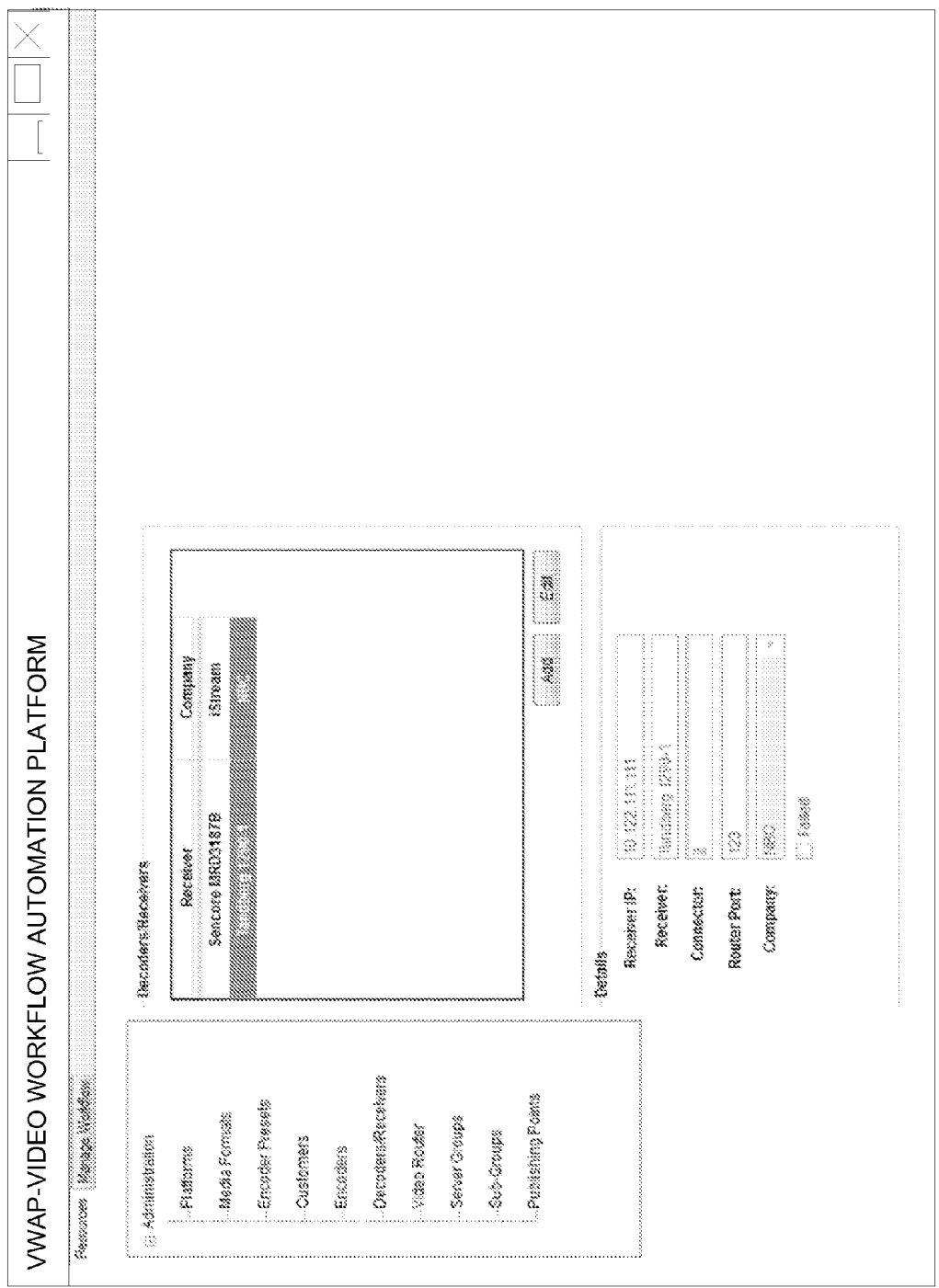
Figure 7G:
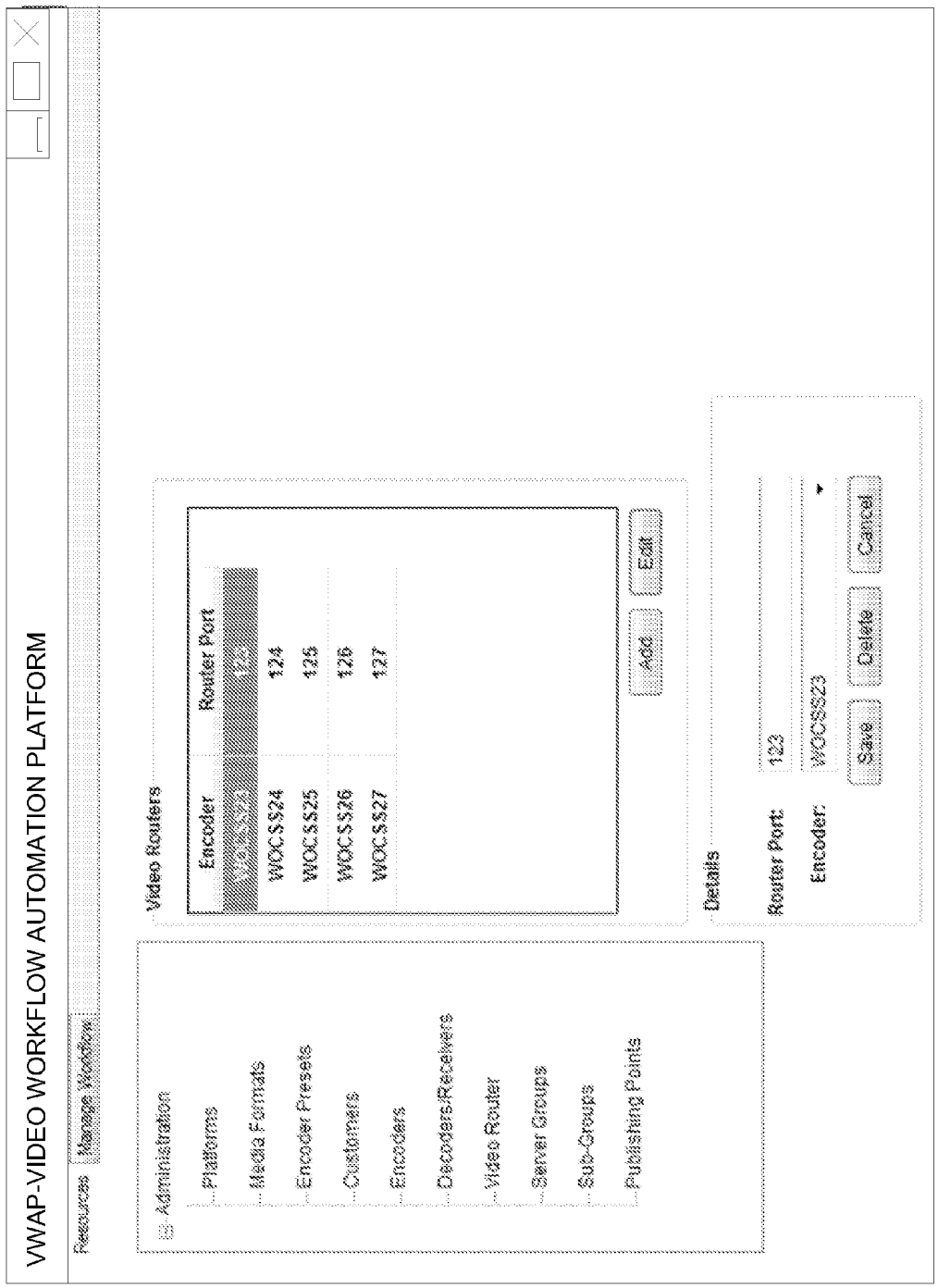
Figure 7H:
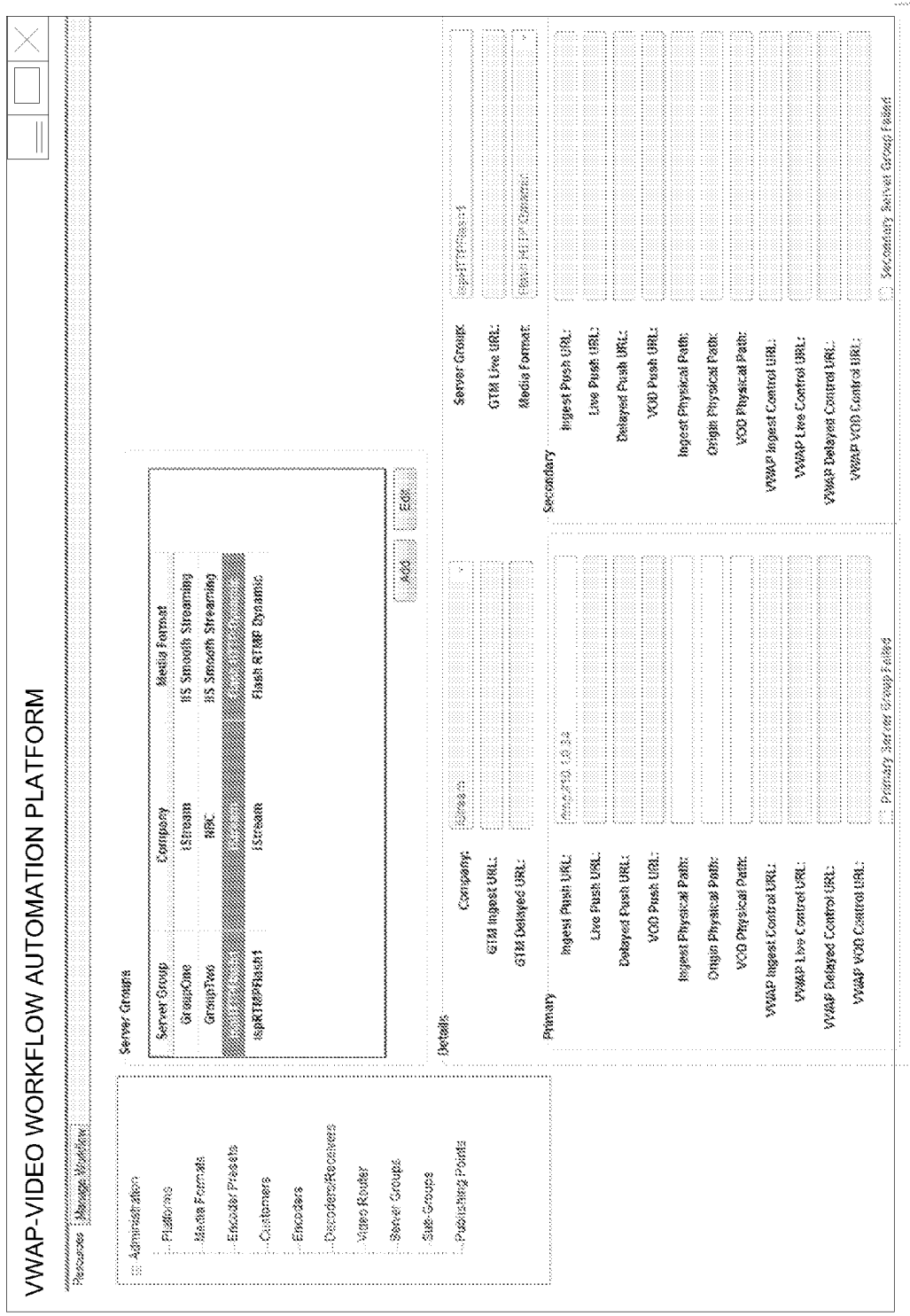
Figure 7I:
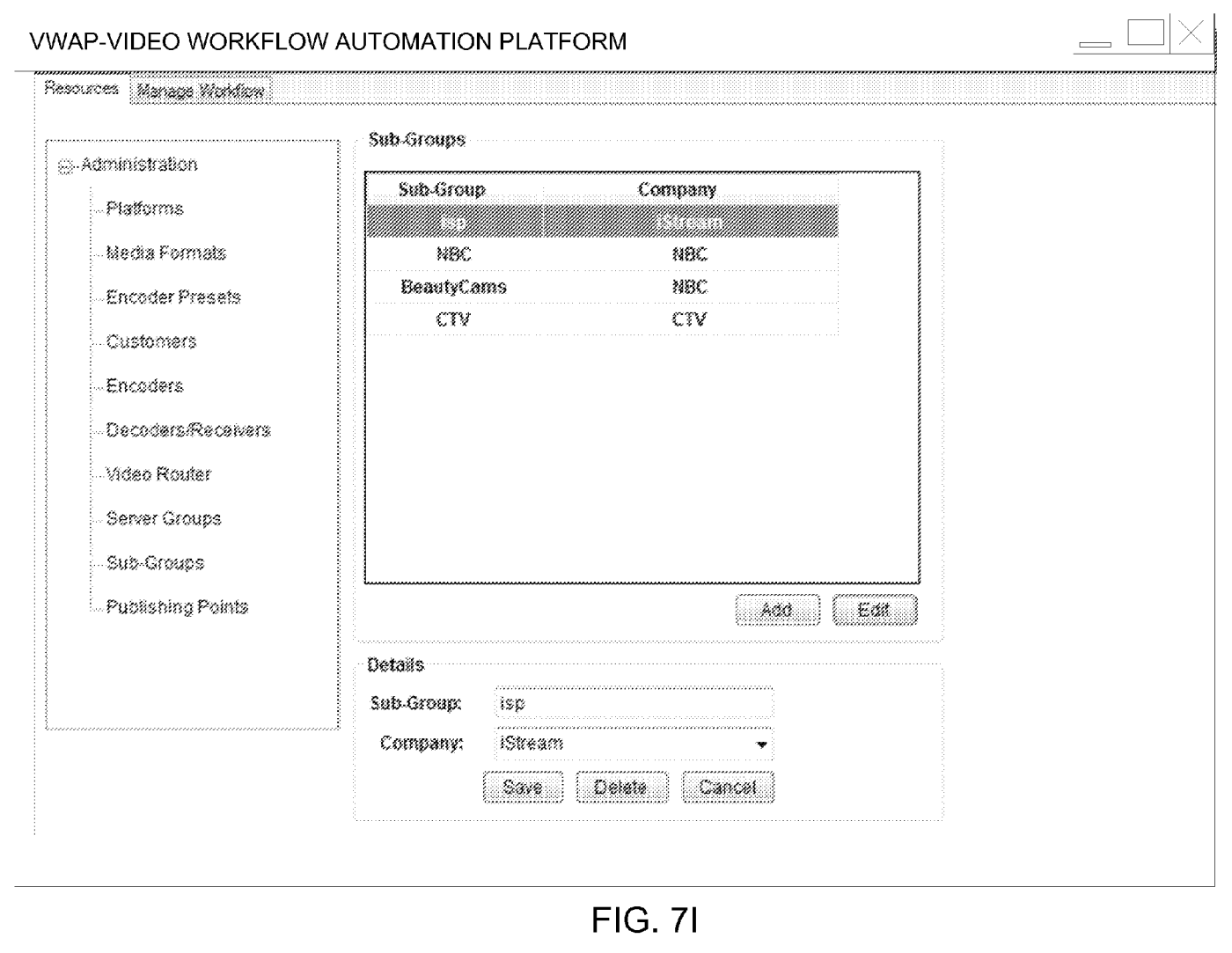
Figure 7J:
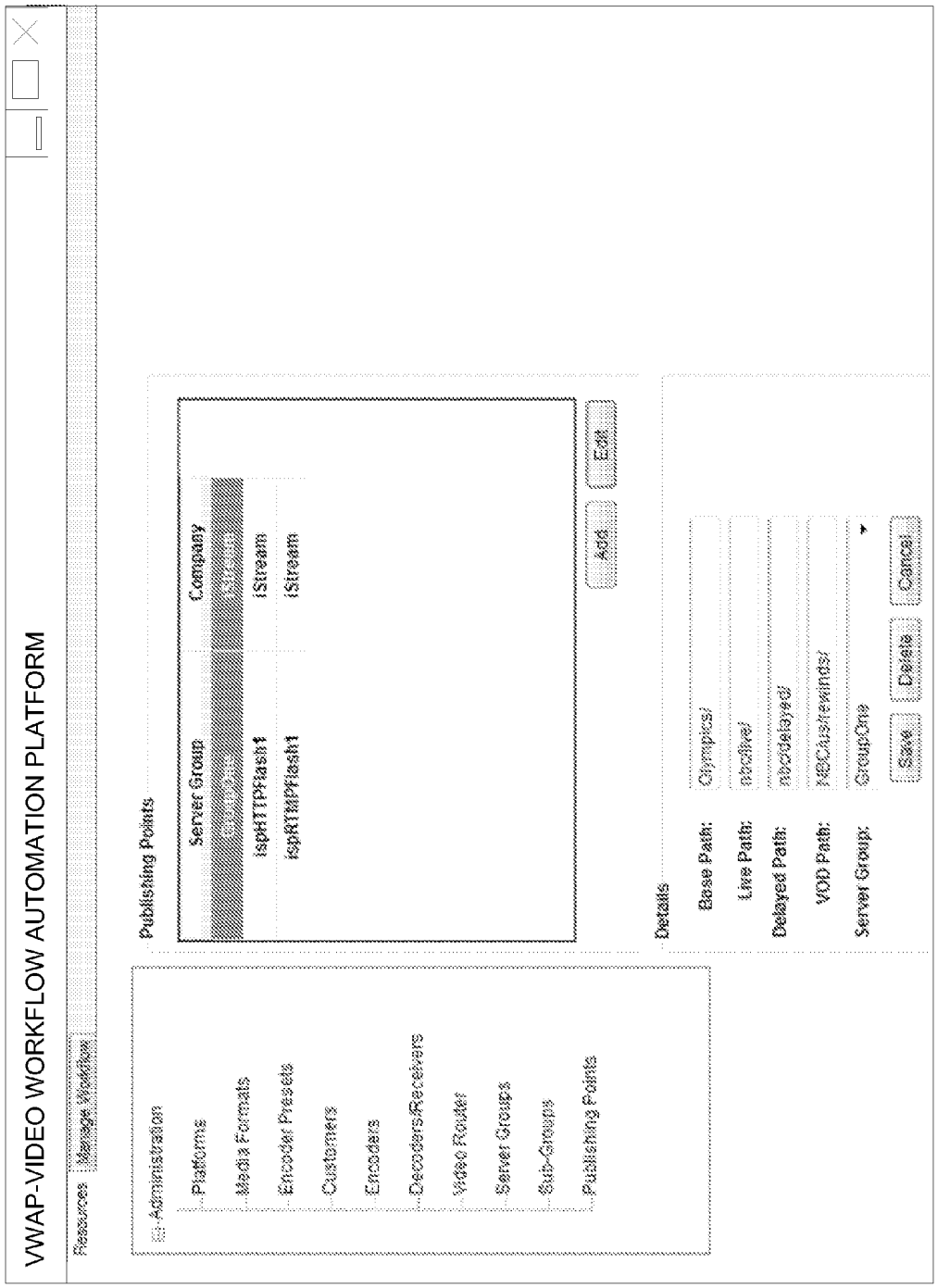
Figure 7K:
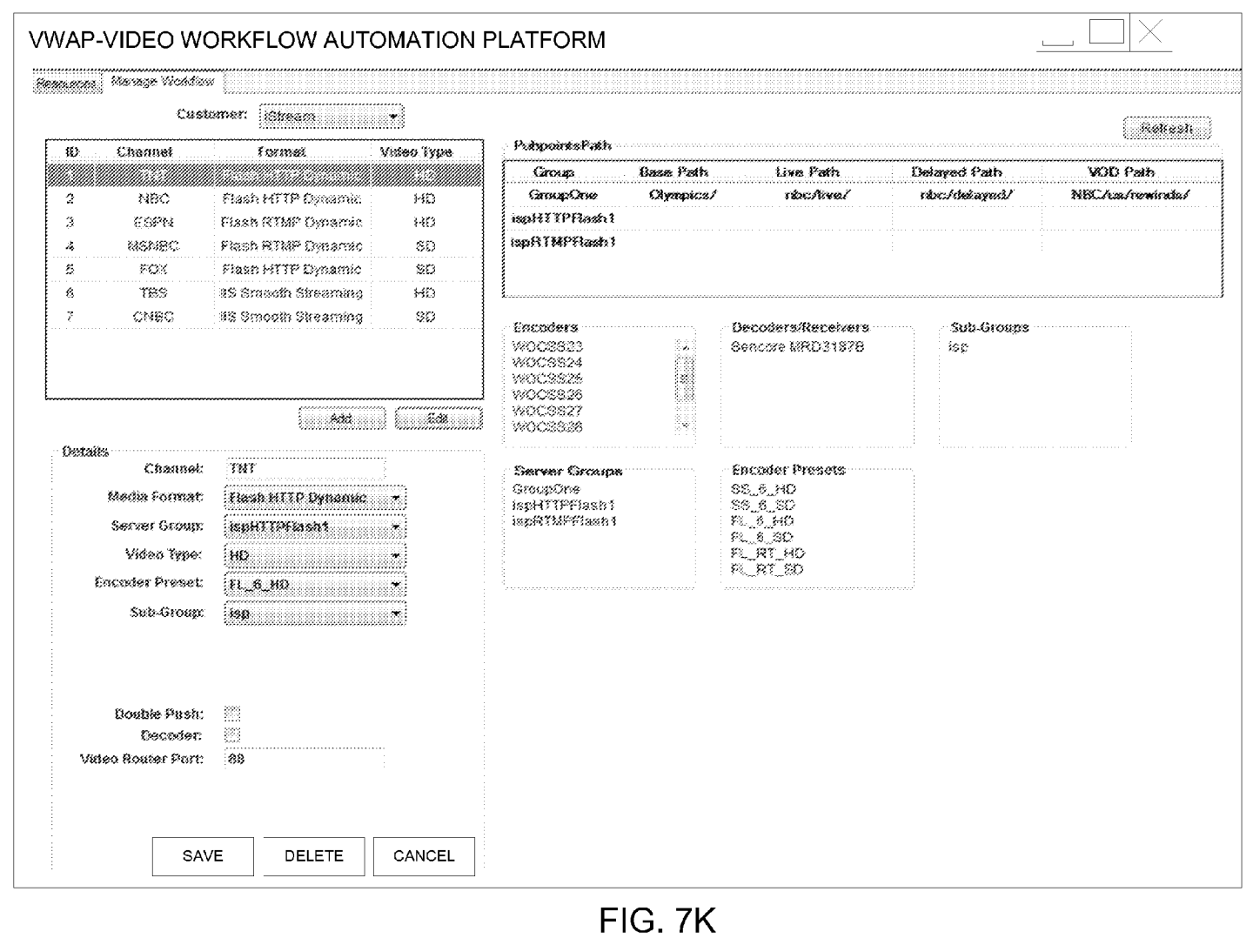
Figure 7L:
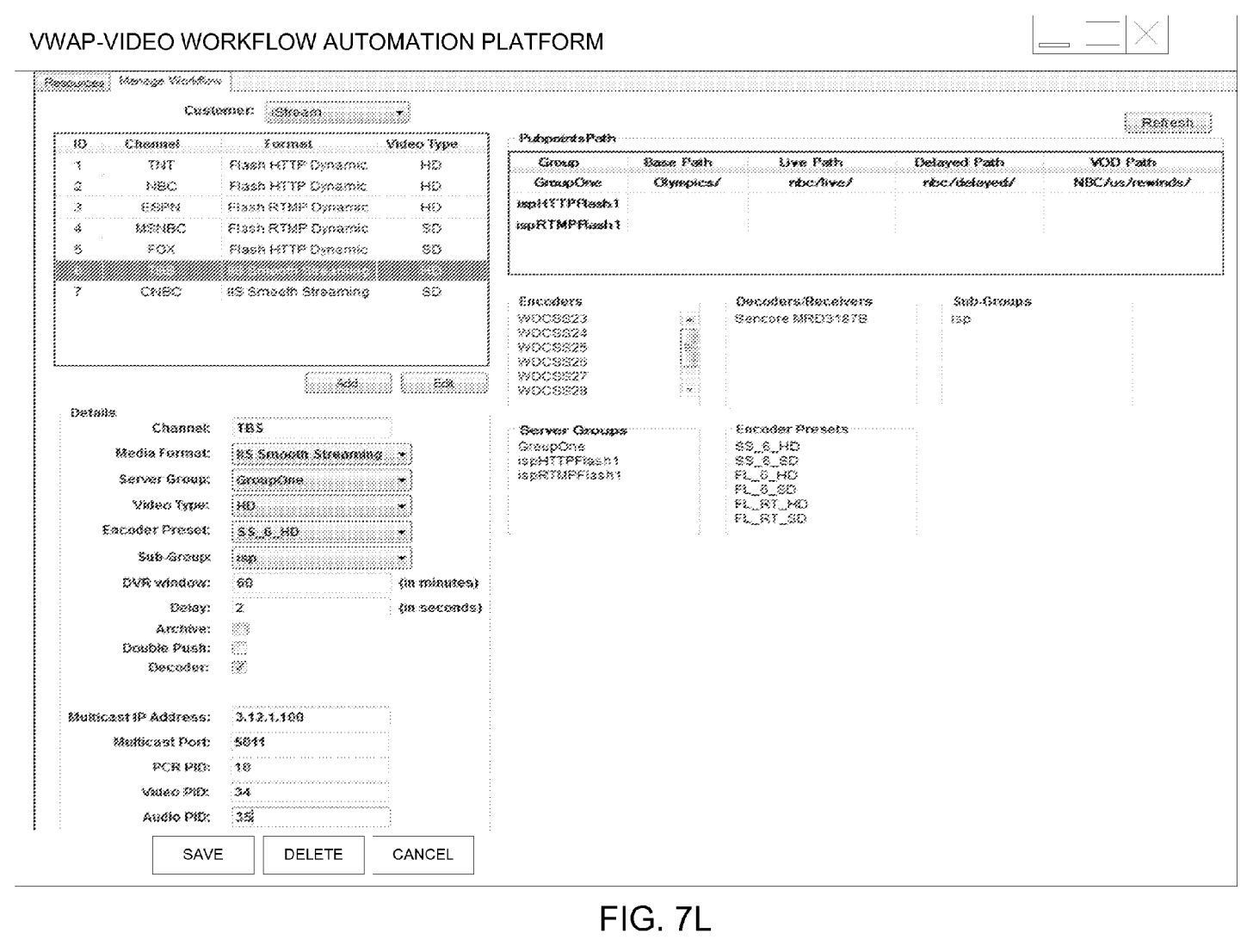

FIGS. 7A-7L illustrate exemplary web pages presented to a human operator of the VWAP 130 for configuring the VWAP 130 to automatically provision resources for acquiring, encoding, and publishing video feeds for delivery over the Internet according to one embodiment. These web pages can be presented to the operator when configuring the VWAP 130, and can be used to populate information in the VWAP database 132 regarding the resources and workflow to be used by the VWAP 130. For example, the operator can select the resources tab to input the different platforms to be supported (e.g., desktop, mobile, IPTV, XBOX, Playstation, or the like) (FIG. 7A), the media formats to be supported (e.g., IIS smooth streaming, Flash HTTP Streaming, Flash RTMP Dynamic Streaming, Apple HTTP Segmented, or the like) (FIG. 7B), the encoder presets (FIG. 7C), the customers (FIG. 7D), the encoders 124 (FIG. 7E), the decoders and/or receivers (FIG. 7F), the router ports (FIG. 7G), server groups with the corresponding VWAP control URLs (FIG. 7H), the subgroups (FIG. 7I), and the publishing points (FIG. 7J). The publishing points in FIG. 7J show the folder structure for that customer's content, and flexibility in placing the customer's content in certain folders. The sub-groups of FIG. 7I may be used by the operator to deal with distribution flexibilities. For example, if you have different kinds of content, or you want to segregate one type of content to be used for certain purpose while other content for others (e.g., geo-fenced content can be stored in one folder while non-geo-fenced content can be stored in another folder). The operator can also select the manage workflow tab to input or review information for each of the customers (FIGS. 7K and 7L). The manage workflow page for the particular customer can include the channel and channel ID, the format and video type, as well as details regarding the origin server(s) (e.g., server pods), the encoder presets, the sub-group, if any, as well as the publishing points paths. As shown in FIG. 7L, the manage workflow page may also show the details regarding the multicast IP address, ports, and the video and audio identifiers.

Referring back to FIG. 1A, in one embodiment, the VWAP 130 tracks statuses of the resources using the VWAP database 132. The VWAP database 132 can store information in one or more storage devices that are local to the computing system hosting the VWAP 130 and/or remote from the computing system hosting the VWAP 130. In another embodiment, the VWAP 130 can also monitor the operations of the resources, such as to confirm whether the raw video is properly acquired, properly routed, and whether the publishing point is receiving and transmitting the encoded video. In addition, other storage schemes other than databases may be used to track the information contained in the VWAP database 132.

In one embodiment, the VWAP 130 tracks an acquisition status of each of the content acquisition resources 101. The acquisition status indicates that the respective acquisition resource is in one of multiple states, including currently being used, currently failed, and currently not being used. The resource can be in at least one of these states at a time or one of these states and another state as would be appreciated by one of ordinary skill in the art having the benefit of this disclosure. The VWAP 130 also tracks an encoding status of each of the encoding resources 103. The encoding status indicates that the respective encoding resource is in one of multiple states, including currently starting, currently being used, currently failed, currently stopped and currently not being used. The VWAP 130 also tracks a publishing status of each of the publishing resources 105. The publishing status indicates that the respective acquisition resource is in one of multiple states, including currently being used, currently failed, and currently not being used. The VWAP 130 can also track the ports of the video router 114. For example, the VWAP 130 can track which ports the resources (e.g., 101 and 103) are coupled in order to make routing connections at the video router 114 between the selected resources as described herein.

In another embodiment, the VWAP 130 communicates with the scheduler 140. The scheduler 140 can execute on a separate computing system as the VWAP 130, or alternatively, on the same computing system. The scheduler 140 maintains a schedule of when the video feeds are to start and stop. The scheduler 140 can provide a user interface (e.g., web-based GUI) that allows a human operator of the scheduler 140 to schedule new webcasts, modify existing webcasts, and/or remove existing webcasts. In one embodiment, the operator uses the scheduler 140 to schedule when the video feeds should be started and stopped for delivery over the Internet. In another embodiment, the scheduler 140 receives input regarding a schedule, such as an electronic programming guide (EPG) 142 or input from an external scheduling system. In one embodiment, the EPG 142 may include multiple channels of multiple networks. In another embodiment, the EPG 142 may be a partial list of available channels of a single network. The EPG 142 may also include additional information other than start and stop times, such as information about the video, as well as other metadata typically found in EPGs. The scheduler 142 may also output on the user interface (e.g., web-based GUI) a representation of the timeline of the scheduled webcasts, as illustrated in the exemplary web pages of FIGS. 8A-8D.

Figure 8A:
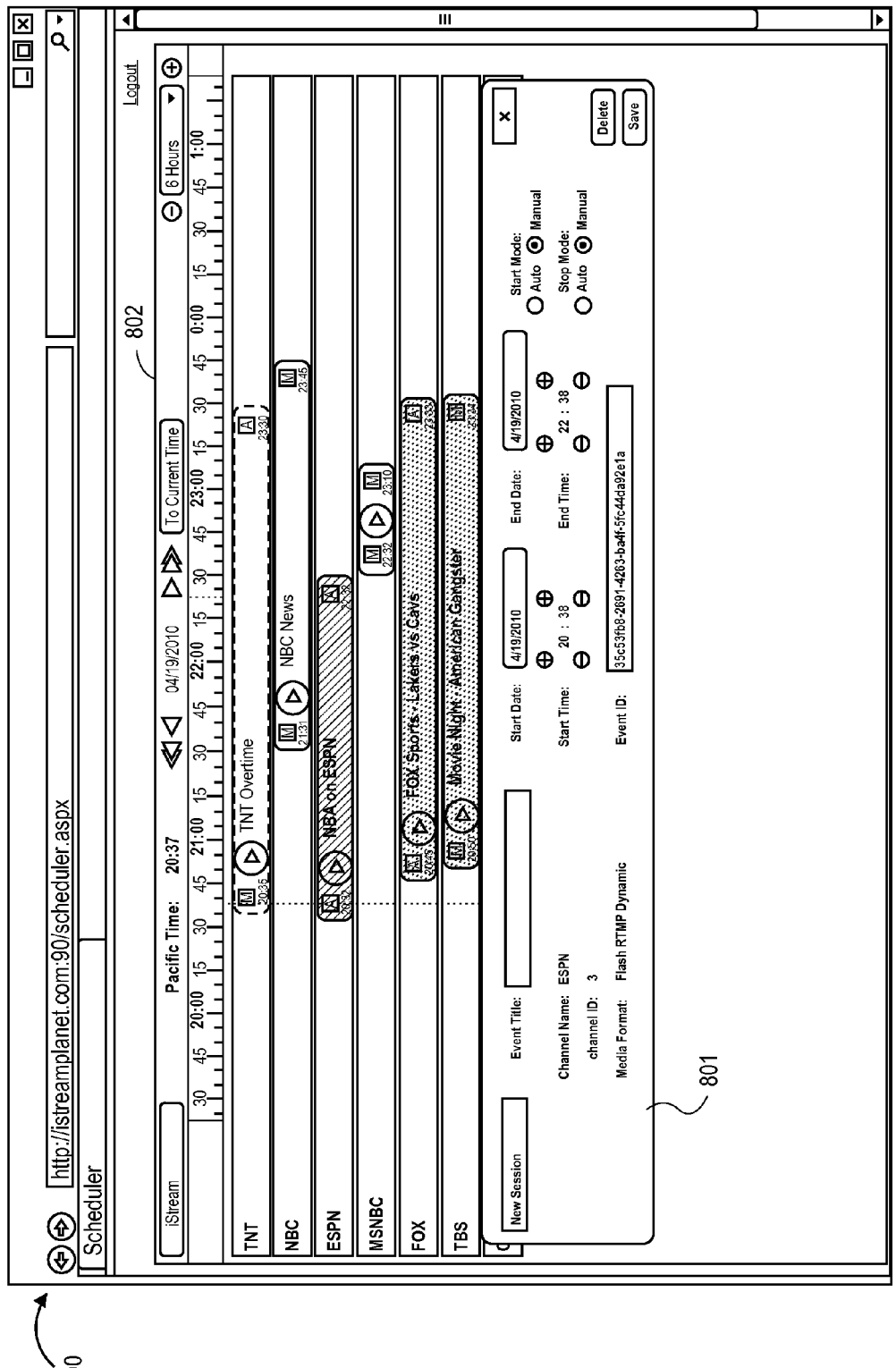
FIGS. 8A-8D illustrate exemplary web pages presented to a human operator of a scheduler for scheduling, starting, and stopping video feeds using the VWAP according to one embodiment.
Figure 8B:
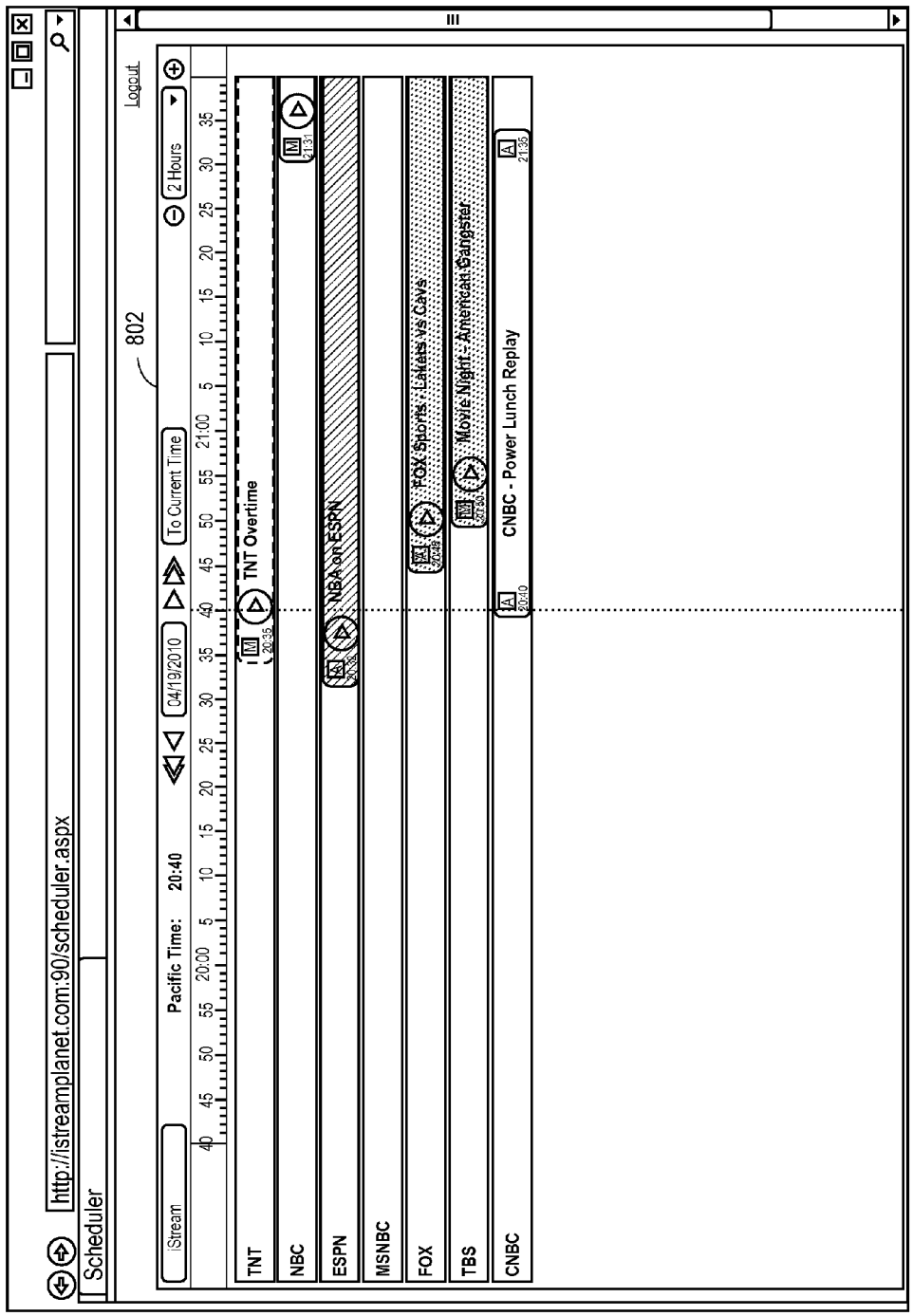
Figure 8C:
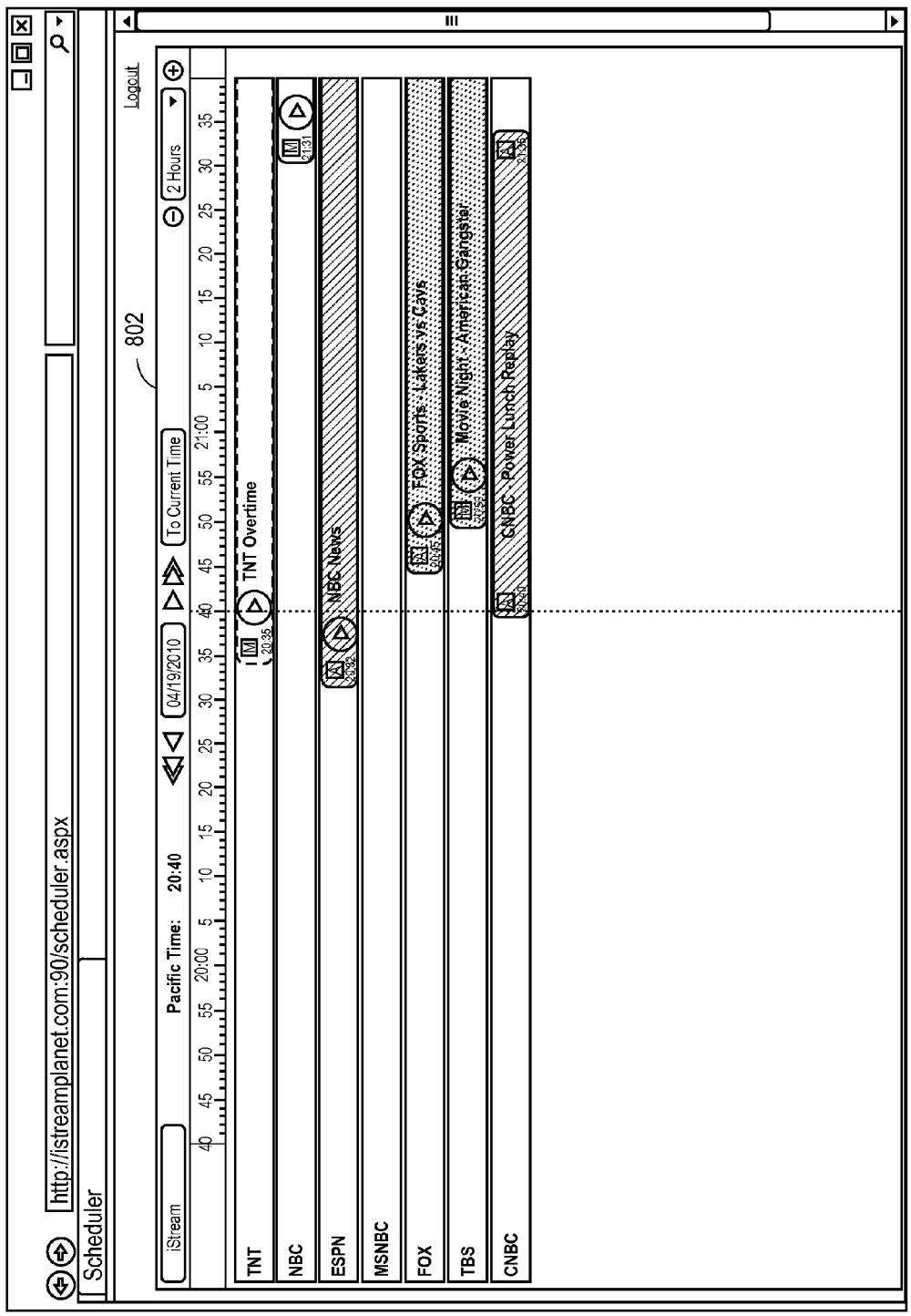
Figure 8D:
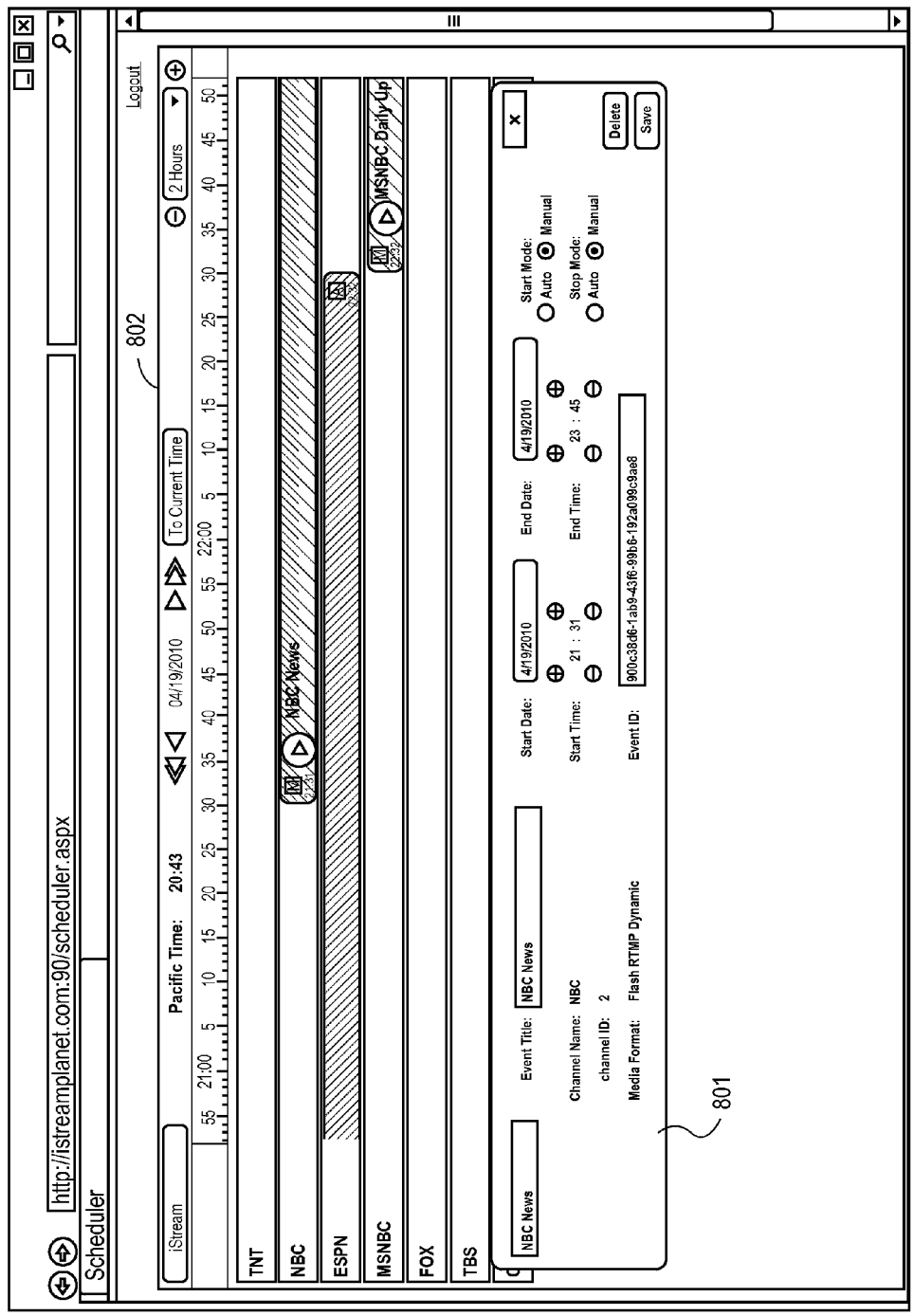

FIGS. 8A-8D illustrate exemplary web pages 800 presented to a human operator of a scheduler for scheduling, starting, and stopping video feeds using the VWAP 130 according to one embodiment. When adding a new event, as shown in FIG. 8A, the web page 800 opens a dialog box 801 to receives information to schedule a new event. The dialog box 801 allows the operator to specify various parameters, such as a name of the event, the start date, the end date, the start time, the end time, channel name, channel ID, media format(s), event ID (or automatically populated by VWAP 130), whether the starting and stopping of the video should be automatic or manual. Some of the fields may have fixed default values or configurable default values that the operator can update. Upon entering the information and clicking save, the scheduled event will appear on the timeline 802. FIG. 8B illustrates the timeline 802 without the open dialog box 801. FIG. 8D illustrates the dialog box 801 when one of the scheduled events has been selected in the timeline 802, such as to modify one of the various parameters described above.

As illustrated in FIGS. 8A-8B, the timeline can be scaled to show the timeline over a specified period of time, such as six hours represented in FIG. 8A, and two hours as represented in FIGS. 8B-8D. The timeline 802 can also illustrate the status of the different scheduled events using color designations or other designations, as illustrated by the different hashing of FIGS. 8A-8D. For example, FIGS. 8B and 8C illustrate the changes in status from "about to start" to "playing" for the event labeled "CNBC—Power Lunch Replay." The status may indicate that the event has started or not, is about to start, and whether the event is scheduled for automatic start or manual start (such as designed by the boxed M and boxed A). The scheduler's interface may also provide a widget to allow the event to be started or stopped manually, such as by clicking on the play or stop button widgets on the scheduled events.

It should be noted that FIGS. 8A-8D illustrate exemplary web pages for scheduling, starting, and stopping video feeds using the VWAP 130, and other embodiments, may use other types of interface to allow a human operator to schedule, start, and stop the video feeds for delivery over the Internet as would be appreciated by one of ordinary skill in the art having the benefit of this disclosure.

Figure 2A:
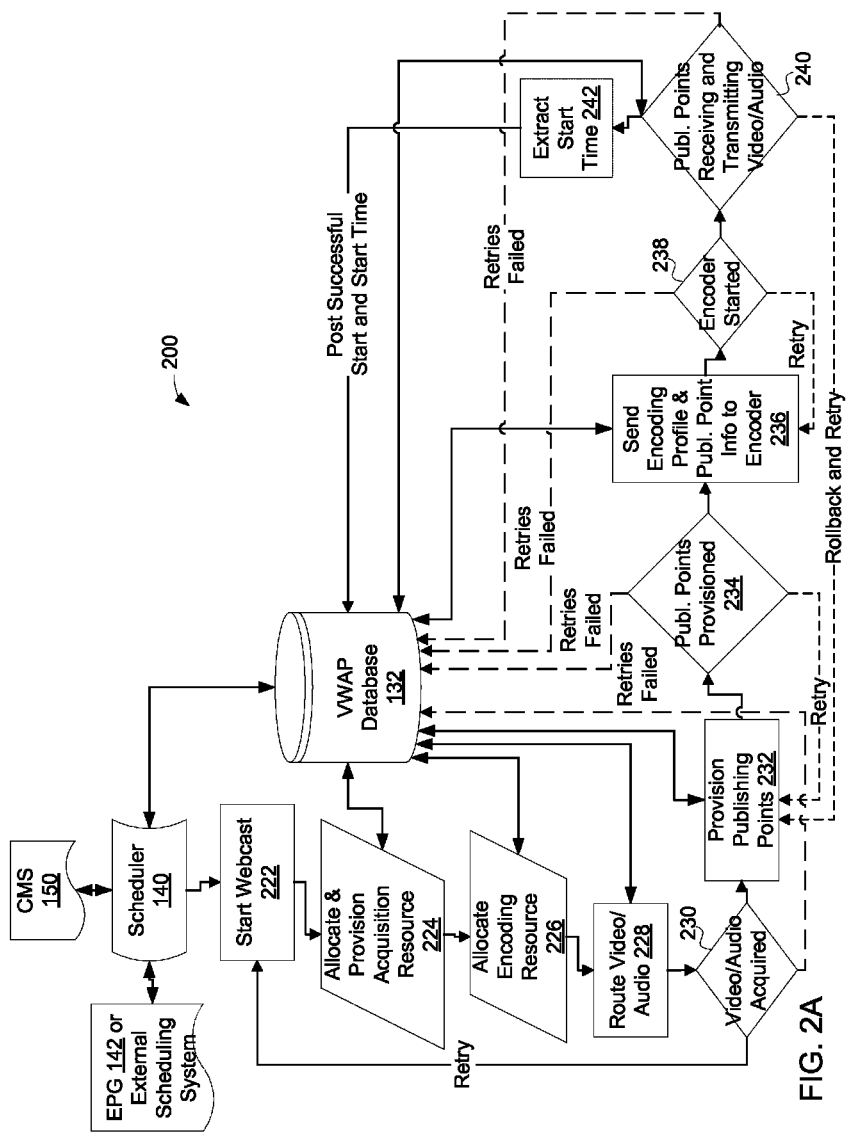
FIG. 2A is a diagram illustrating an automated process to start a video feed using the VWAP of FIG. 1 according to one embodiment.
Figure 2B:
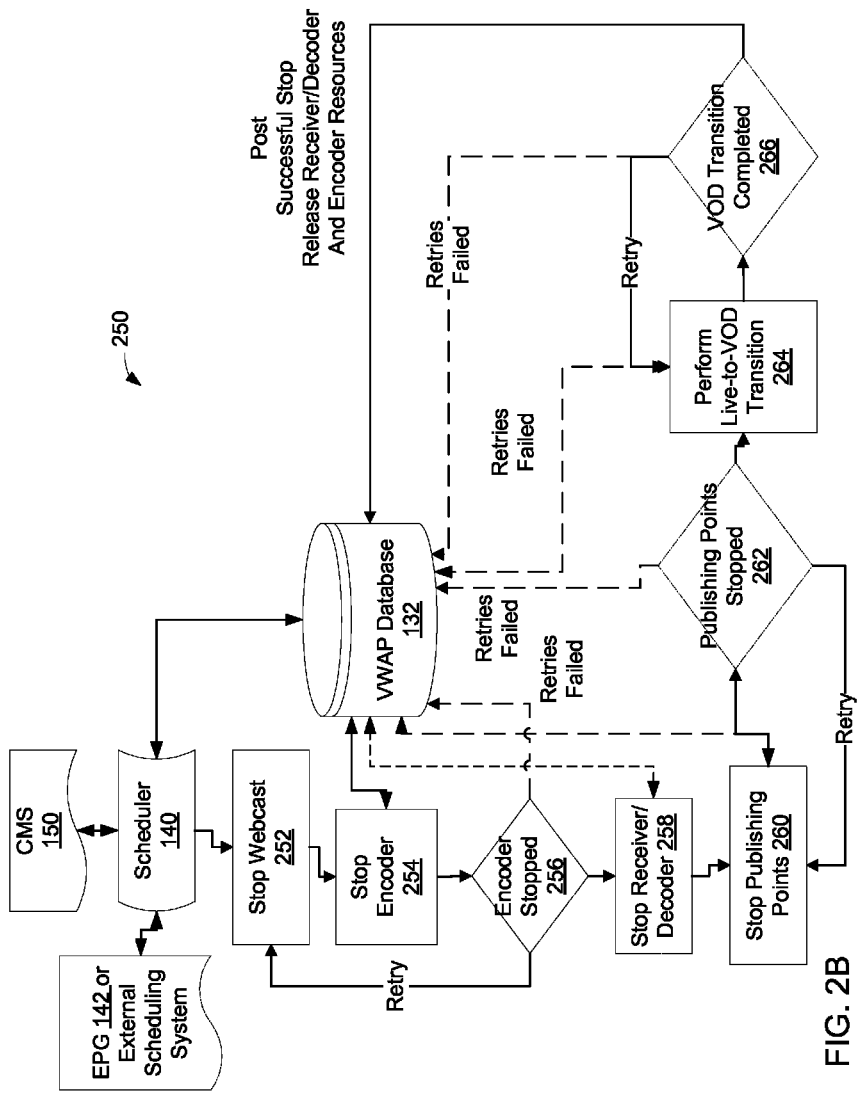
FIG. 2B is a diagram illustrating an automated process to stop a video feed using the VWAP of FIG. 1 according to one embodiment.

Referring back to FIG. 1A, in one embodiment, the scheduler 140 sends a trigger to the VWAP 130 to start and/or stop the video feed, such as described in the automated start and stop processed described in more detail with respect to FIGS. 2A and 2B. In another embodiments, the operator of the VWAP 130 can send the trigger to the VWAP 130 to start and/or stop the video feed without using the scheduler 140. In another embodiment, the VWAP 130 can detect a failover condition that generates a trigger for the VWAP 130 to perform an automated processed to provision resources for failover, as described in more detail with respect to FIGS. 3A and 3B.

In one embodiment, in order to provision the resources to acquire, encode, and publish any particular video feed received at the video router 114, the VWAP 130 may perform the following process to start the video:

1) receive a start trigger (e.g., from scheduler) to start a video feed (e.g., MSNBC);
2) select one of the decoders 112 (e.g., decoder #1) (or receivers 120);
3) send instructions to subscribe the selected decoder to one of the channels using the multicast IP address and port, the video identifier, and the audio identifier (or configure one of the receivers to receive the satellite video feed over the satellite link);
4) determine which port of the video router 114 is coupled to the selected decoder 112 (e.g., port 100 is coupled to decoder #1);
5) select one of the encoders 124 (e.g., encoder #5);
6) determine which port of the video router 144 is coupled to the selected encoder 124 (e.g., port #120);
7) determine where to publish the video and the encoding profile to use for encoding;
8) select one of the origin servers 160 (origin server #1) and create a publishing point for the selected origin server 160 where the video is to be published (e.g., in the embodiment of FIG. 1B, create a publishing point for each of the ingest server 162, live server 164, delayed server 166, and VOD server 168), and optionally create a publishing point for the secondary origin server 170 optionally for a failover publishing point (e.g., ingest server 172, live server 174, delayed server 176, and VOD server 178);
9) instruct the selected encoder 124 (encoder #5) to receive the raw video from the determined port (e.g., #120) of the video router, where to publish the video determined in 6) and to encode according to the determine encoding profile in 6);
10) start the selected encoder 124 (encoder #5);
11) check to make sure the created publishing points are working;
12) extract an actual start time of the video from the selected origin server 160 (e.g., delayed server 166); and
13) post a successful start of the video and the actual start time of the video feed. The actual start time can be used by the CMS 150 to provide the URL of the publishing point (e.g., URL of live server, URL of delayed server, URL of VOD server) and the actual start time of the publishing point, which can be used to synchronize other data with the video and audio (e.g., game play-by-play data).

In another embodiment, in order to make the resources available, such as after completion of the video or in response to a trigger to stop the video, the VWAP 130 may perform the following process to stop the video:

1) receive a stop trigger (e.g., from scheduler) to stop the subscribed channel (e.g., MSNBC);
2) send instructions to the selected encoder (encoder #5) to stop the encoder;
3) send instructions to unsubscribe the selected decoder (or receiver) from the subscribed channel;
4) send instructions to the video router 114 to terminate the video router connection at the video router 114;
5) move all files to the proper VOD directory from the origin server 160 (e.g., live server 164 and delayed server 166) (optional);
6) create redirecting file (e.g., HTTP .302 file) to shift the publishing point to a VOD publishing point (e.g., VOD server 168) (optional); and
7) post a successful stop of the video and the stop time of the video feed. For example, the VWAP 130 can post the successful stop to the CMS 150 to redirect the viewers to the VOD publishing point (e.g., URL of live server and URL of delayed server are shifted to the URL of VOD server) or to permanently remove access to that particular webcast now that live video feed has ended.

FIG. 2A is a diagram illustrating an automated process 200 to start a video feed using the VWAP 130 of FIG. 1 according to one embodiment. The start process 200 begins in response to a trigger (start trigger) received from the scheduler 140. The trigger may be generated by the scheduler 140 in response to a scheduled event of a schedule maintained by the scheduler 140. Alternatively, the scheduler 140 generates a trigger in response to manual user input at the scheduler 140. As described above, the scheduler 140 may receive the EPG 142 or input from an external scheduling system, and the scheduler 140 communicates with the CMS 150 to send the CMS 150 updates regarding the schedule, such as an actual start time of the scheduled event.

The VWAP 130 receives the trigger to start the webcast of one of the video feeds (block 222), and automatically allocates and provisions a content acquisition resource (e.g., decoder 112 or receiver 120) (block 224). In one embodiment, the VWAP 130 accesses the VWAP database 132 to automatically select one of the content acquisition resources that is not currently being used. As described herein, the VWAP 130 tracks information regarding the resources in the VWAP database 132. The VWAP 130 also allocates an encoding resource (block 226) such as by accessing the VWAP database 132 to automatically select one of the encoding resources that is not currently being used. The VWAP 130 routes the raw video/audio from the selected content acquisition resource to the selected encoding resource (block 228). In one embodiment, the VWAP 130 accesses the VWAP database 132 to look up the ports of the video router 114 to which the selected resources are coupled. The VWAP 130 communicates with the router 114 to establish a routing connection between those ports to route the raw video from the selected content acquisition resource to the selected encoding resource.

The VWAP 130 confirms whether the video/audio is properly acquired and routed (block 230). If at block 230, the raw video is not properly acquired, the VWAP 130 repeats the process, returning to block 222. The VWAP 130 may retry the same resources while repeating, or alternatively, may allocate and provision new resources. If at block 230, the raw video is properly acquired, the VWAP 130 provisions one or more publishing points (block 232). The VWAP 130 accesses the VWAP database 132 to automatically select one of the publishing resources not currently being used, and to look up the corresponding publishing point URL associated with the selected publishing resource. The VWAP 130 can also determine an encoding profile based on information stored in the VWAP database 132. The VWAP 130 confirms whether the publishing point is provisioned (block 234). If at block 234, the publishing point is not properly provisioned, the VWAP 130 retries, returning to block 232. If at block 234, the publishing point is properly provisioned, the VWAP 130 sends the encoding profile and the publishing point information to the selected encoding resource (block 236) and starts the selected encoding resource. The VWAP 130 confirms whether the selected encoding resource has been started (block 238). If not, the VWAP 130 retries, returning to block 236. If started, the VWAP 130 confirms whether the provisioning point is receiving and transmitting the video (block 240). If not, the VWAP 130 may rollback and retry provisioning the publishing point at block 232. If the provisioning point is receiving and transmitting the video at block 240, the VWAP 130 extracts an actual start time (block 242) from the publishing point (or from the encoding resource that has access to a time code (i.e., connected to a time code generator) and enabled during the encoding), and posts a successful start and the actual start time to the VWAP database 130. The VWAP 130 can also extract from the publishing point when the publishing point receives the first of the encoded video (video and audio information). Once posted, the scheduler 140 can notify the CMS 150 of the successful start and the actual start time of the video feed.

As illustrated in FIG. 2A, the VWAP 130 can verify proper provisioning and retry provisioning the same resources or new resources, as indicated in the dashed retry lines. In another embodiment, the VWAP 130 can be configured to retry a specified number of times, and if still unsuccessful, post that the retries have failed to the VWAP database 132 to indicate that the resources cannot be provisioned, as illustrated by the dashed retries failed lines. In one embodiment, the scheduler 140 can detect the retries failed and notify a human operator of the scheduler 140 that the resources cannot be provisioned for the video feed, allowing the operator to take corrective actions.

In another embodiment, at block 232, the VWAP can provision multiple publishing points as described above with respect to FIGS. 1A and 1C. In this embodiment, the VWAP 130 provisions a first publishing point for a first format and one or more additional publishing points for one or more additional formats. Each of the publishing points receives the same encoded video from a shared encoding resource. At blocks 234, 236, 238, and 240, the process is performed for each of the publishing points provisioned at block 232.

It should be noted that the start process 200 is performed in response to each trigger received for each of the video feeds. For example, these start process 200 can be performed simultaneously or concurrently for multiple video feeds that are scheduled to start at the same time or approximately at the same time. It should also be noted that VWAP 130 automatically handles the dependencies of the various tasks being performed.

FIG. 2B is a diagram illustrating an automated process 250 to stop a video feed using the VWAP 130 of FIG. 1 according to one embodiment. The stop process 250 begins in response to a trigger (stop trigger) received from the scheduler 140 much like the start trigger. The VWAP 130 receives the trigger to stop the webcast of one of the video feeds (block 252), and stops the respective encoder (block 254). In one embodiment, the VWAP 130 accesses the VWAP database 132 to determine which of the encoding resources was previously selected by the VWAP 130 to encode the video feed, and communicates with this encoding resource to stop the encoding of the video feed. The VWAP 130 automatically confirms whether the encoding resource has stopped (block 256). If not, the VWAP 130 retries, returning to block 252. Once the VWAP 130 confirms the encoding resource has stopped encoding, the VWAP 130 stops the content acquisition resource (e.g., decoder 112 or receiver 120) (block 258). In one embodiment, the VWAP 130 accesses the VWAP database 130 to determine which content acquisition source 101 was previously selected to acquire the video feed, and communicates with this content acquisition resource 101 to stop acquiring the video feed. In addition, the VWAP 130 stops the publishing points (block 260). The VWAP 132 may access the VWAP database 132 to determine which publishing points need to be stopped. In one embodiment, the VWAP 130 can stop the live and delayed publishing points without stopping the VOD publishing point, and allow the delayed publishing points to be redirected to the VOD publishing point as described with respect to the live-to-VOD transition at block 264. In another embodiment, the encoder stops the publishing point(s), while the VWAP 130 shuts them down (i.e., releasing the resources). The VWAP 130 can be used in override situations in case encoder was unable to stop the publishing point(s). The VWAP 130 automatically confirms whether the publishing points have been stopped (block 262). If not, the VWAP 130 retries, returning to block 260. Once the VWAP 130 confirms the publishing points have stopped at block 262, in one embodiment, the VWAP 130 posts a successful stop to the VWAP database 132 and releases the resources (e.g., decoder, receiver, and encoders) so they can be used for other video feeds. In another embodiment, the VWAP 130 performs the live-to-VOD transition (block 264). In the live-to-VOD transition, the VWAP 130 creates the redirecting file to redirect the publishing points associated with at least the live stream to be shifted to the VOD stream. The VWAP 130 may move the files created by the live server 164 (or the delayed server 166) into the directory used by the VOD server 168. The VWAP 130 automatically confirms whether the VOD transition is complete (block 266). If not, the VWAP 130 retries, returning to block 264. Once the VWAP 130 confirms the VOD transition is complete, the VWAP 130 posts the successful stop, releases the resources, and sends the updated publishing point (e.g., VOD publishing point) to the VWAP database 132. The scheduler 140 can notify the CMS 150 that the video has been stopped, as well as send the updated publishing information (e.g., VOD URL) for the live-to-VOD transition, if performed.

Figure 3A:
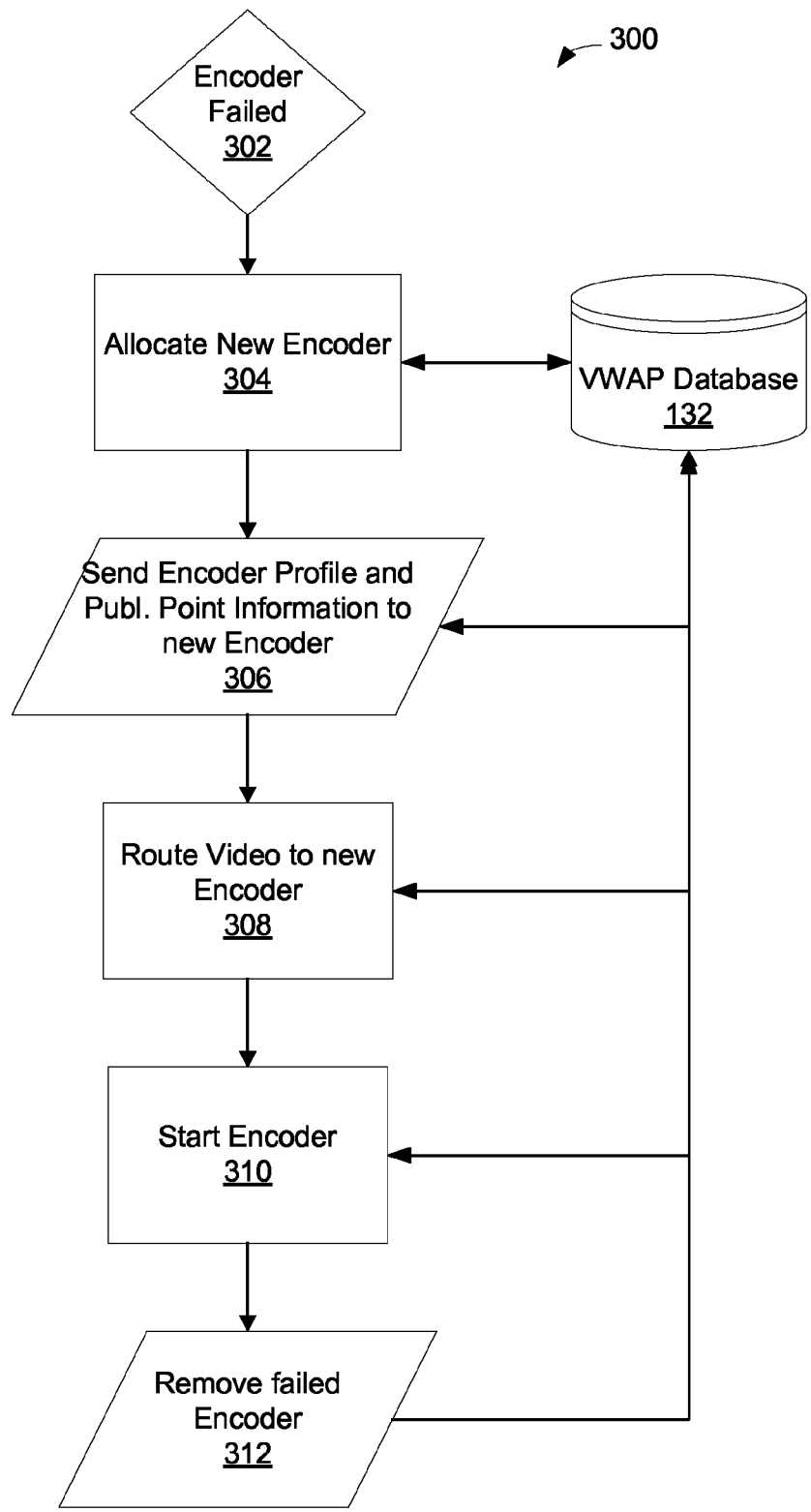
FIG. 3A is a diagram illustrating an automated failover process to provision a new encoding resource according to one embodiment.

FIG. 3A is a diagram illustrating an automated failover process 300 to provision a new encoding resource according to one embodiment. The failover process 300 begins when the VWAP 130 detects that one of the encoders 124 has failed (or other encoding resource) (block 302), and the VWAP 130 automatically allocates a new encoder 304 (block 304). In one embodiment, the VWAP 130 accesses the VWAP database 132 to automatically select one of the encoders 124 that is not currently being used. The VWAP 130 sends the encoding profile and the publishing point information to the new encoder (block 306). The VWAP 130 can access the encoding profile and publishing point in the VWAP database 132. The VWAP 130 routes the raw video/audio from the previously selected content acquisition resource to the new encoder (block 308). In one embodiment, the VWAP 130 accesses the VWAP database 132 to look up the ports of the video router 114 to which the previously selected content acquisition and the new encoder are coupled. The VWAP 130 communicates with the router 114 to establish a new routing connection between those ports to route the raw video from the selected content acquisition resource to the new encoder. The VWAP 130 starts the new encoder (block 310), such as by communicating with the new encoder, and then removes the failed encoder (block 312). In one embodiment, the VWAP 130 removes the failed encoder by posting the status of the encoder in the VWAP 130 database. The VWAP's user interface (e.g., the monitoring web page in FIG. 6) may indicate that the encoder has failed in order to allow a human operator to take corrective action. Since the failed encoder has a failed status, the VWAP 130 will not select the failed encoder for allocation and provisioning of other video feeds until the status is set to the "not currently being used" or idle and available state.

Figure 3B:
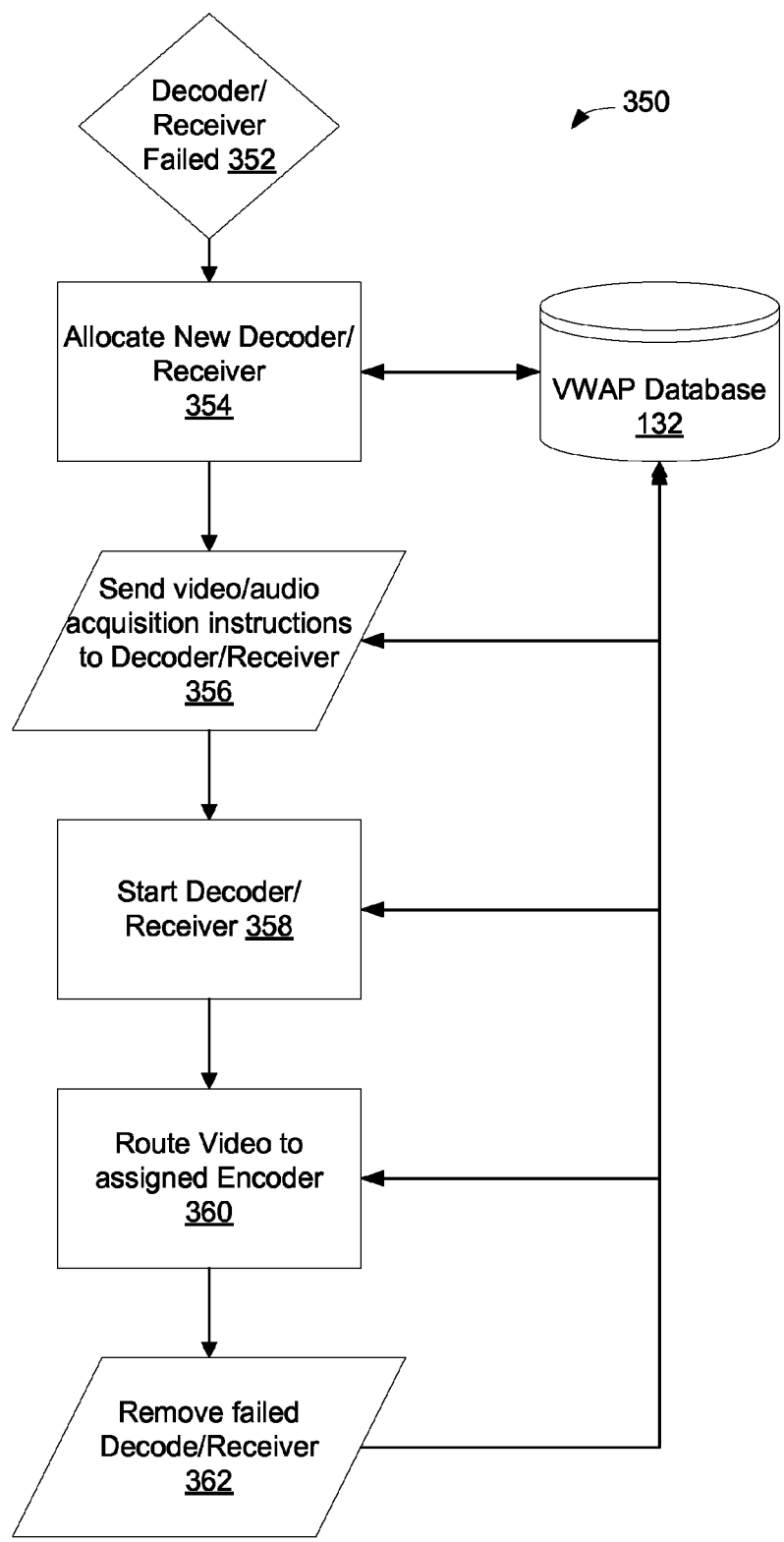
FIG. 3B is a diagram illustrating an automated failover process to provision a new content acquisition resource according to one embodiment.

FIG. 3B is a diagram illustrating an automated failover process to provision a new content acquisition resource according to one embodiment. The failover process 350 begins when the VWAP 130 detects that one of the decoders 112 or receives 120 has failed (or other content acquisition resource) (block 352), and the VWAP 130 automatically allocates a new decoder/receiver (block 354). In one embodiment, the VWAP 130 accesses the VWAP database 132 to automatically select one of the decoder/receiver that is not currently being used. The VWAP 130 sends the acquisition instructions to the new decoder/receiver (block 356). The VWAP 130 can access the acquisition instructions in the VWAP database 132. The VWAP 130 starts the new decoder/receiver (block 358), and routes the video from the new decoder/receiver to the previously selected encoder (block 360). In one embodiment, the VWAP 130 accesses the VWAP database 132 to look up the ports of the video router 114 to which the previously selected encoder and the new decoder/receiver are coupled. The VWAP 130 communicates with the router 114 to establish a new routing connection between those ports to route the raw video from the new decoder/receiver to the previously selected encoder. The VWAP 130 then removes the failed decoder/receiver (block 362). In one embodiment, the VWAP 130 removes the failed decoder/receiver by posting the status of the decoder/receiver in the VWAP 130 database. The VWAP's user interface (e.g., monitoring web page of FIG. 6) may indicate that the decoder/receiver has failed in order to allow a human operator to take corrective action. Since the failed decoder/receiver has a failed status, the VWAP 130 will not select the failed decoder/receiver for allocation and provisioning of other video feeds until the status is set to the "not currently being used" or idle state.

Figure 4A:
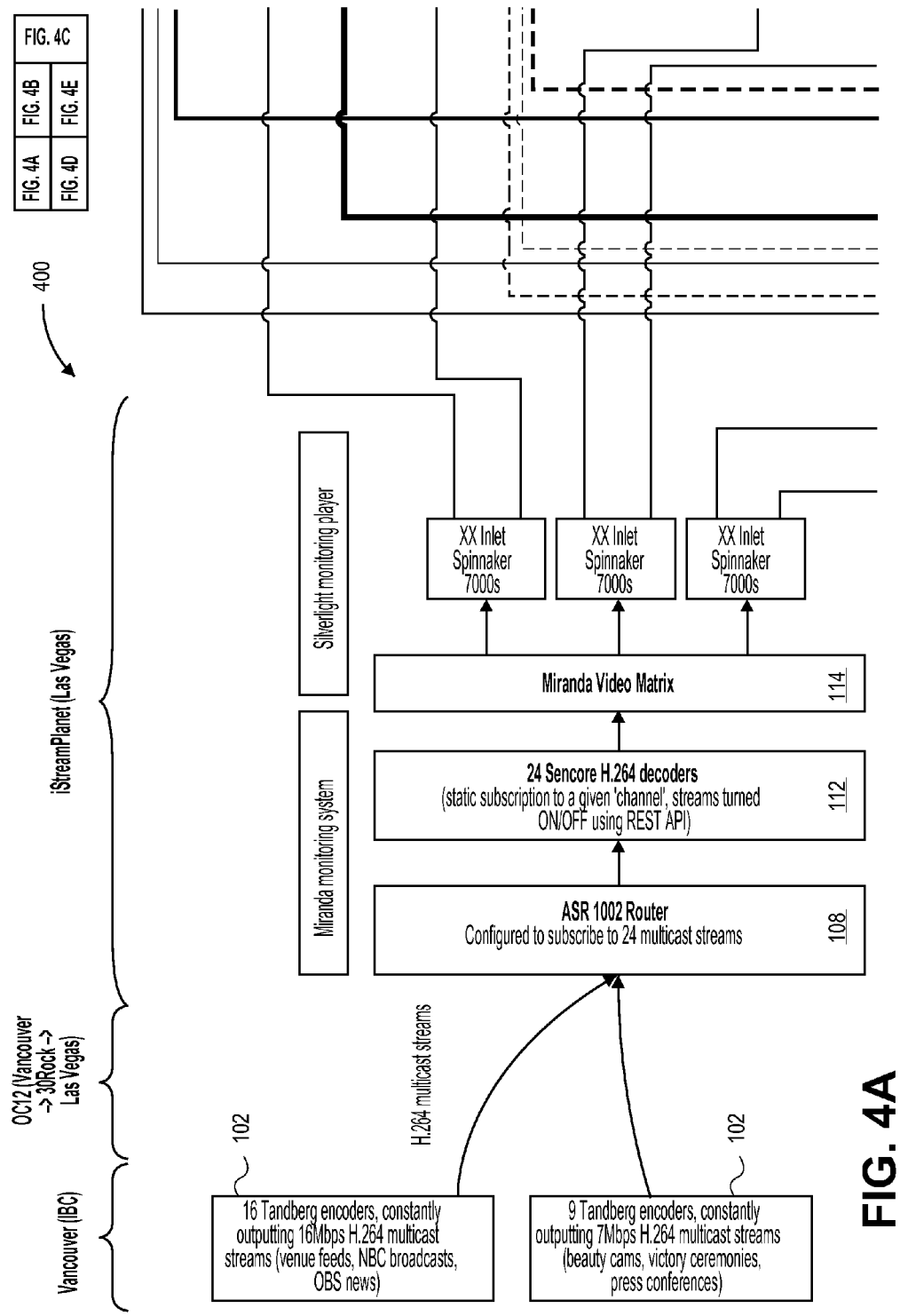
Figure 4B:
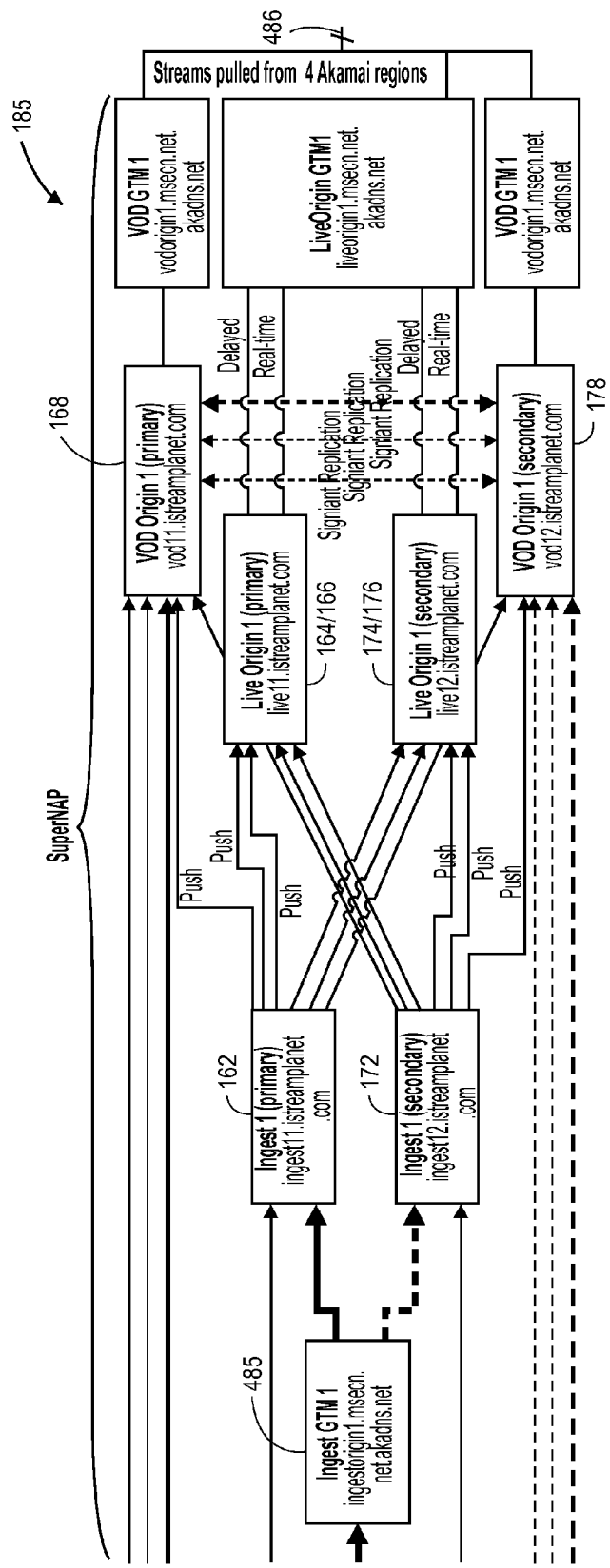
Figure 4C:
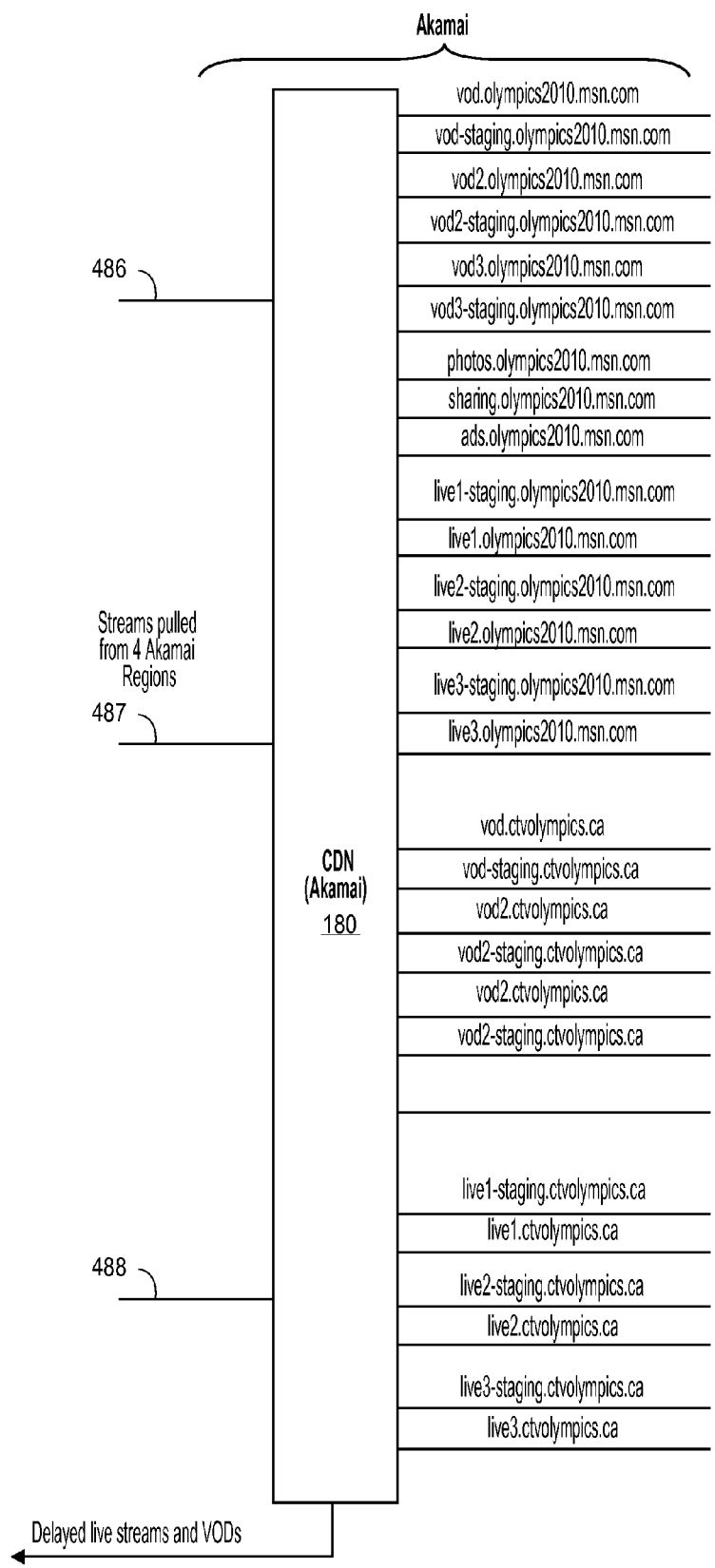
Figure 4D:
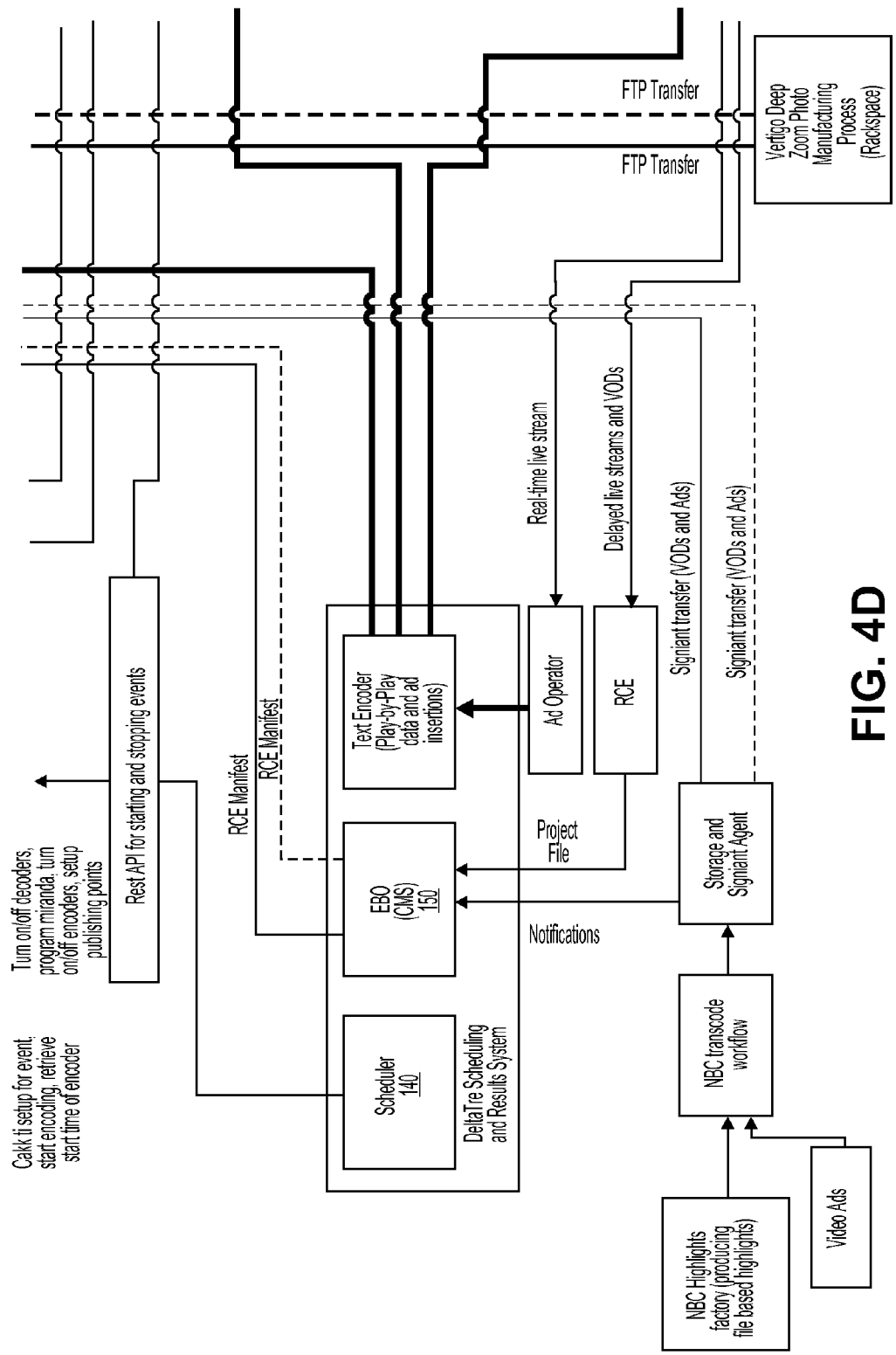

FIGS. 4A-4E are block diagrams of another exemplary network architecture 400 in which embodiments of the VWAP 130 may operate. The exemplary network architecture 400 includes twenty-six source encoders as the content acquisition resources 102, and ASR 1002 router as the end-point IP multicast router 108, which is configured to subscribe to twenty-four H.264 multicast streams. The network architecture 400 also includes twenty-four decoders 112 (e.g., twenty-four Sencore H.264 decoders), which have a static subscription to a given channel. The streams of the decoders 112 may be turned on/of using a Representational State Transfer Application Programming Interface (Rest API). The network architecture 400 also includes a Miranda Video Matrix as the video router 114. As depicted, the network architecture 400 may also include monitoring systems, such as the Miranda monitoring system and Silverlight monitoring player to monitor the activity of the resources. As shown in FIGS. 4B and 4E, the network architecture 400 also includes an origin architecture similar to the architecture described with respect to FIG. 1B, having an ingest server 162, live and delayed servers 164/168, and VOD server 168, as well as the secondary servers 172-178. These figures also depict the GTM 185 from which streams can be pulled over lines 486-488 from one or more CDNs 180 (e.g., 4 Akamai Regions) as shown in FIG. 4C. FIG. 4C also shows the publishing points (e.g., URLs) where the different streams are published for delivery over the Internet. These figures also depict a GTM 485 between a text encoder (e.g., play-by-play data and advertisement insertion) controlled by an advertisement operator as shown in FIG. 4D. The text encoder can send data to the GTM 185 to be input into the ingest servers to be synchronized with the appropriate video feeds. FIG. 4D also shows the scheduler 140, the CMS 150, as well as additional components used to provide notifications to the CMS 150, such as the rough cut editor (RCE), which allows creation of highlights or clips of the live video, and other workflow components used for uploading and managing files. The scheduler 140 communicates with the VWAP 130, which provides REST APIs to the resources in FIG. 4A to start and stop event as described herein. For example, the REST APIs can be used to call the resources to setup for an event, start encoding, retrieving the actual start time from the publishing point, turning decoders on/off, programming the video router, turning the encoders on/off, and calls to web services on origin servers for creating and controlling publishing points. The embodiment illustrated in FIGS. 4A-4E is one example of a network architecture in which the VWAP 130 can operate. Alternatively, other configurations with more or less components may be used as would be appreciated by one of ordinary skill in the art having the benefit of this disclosure.

Figure 5:
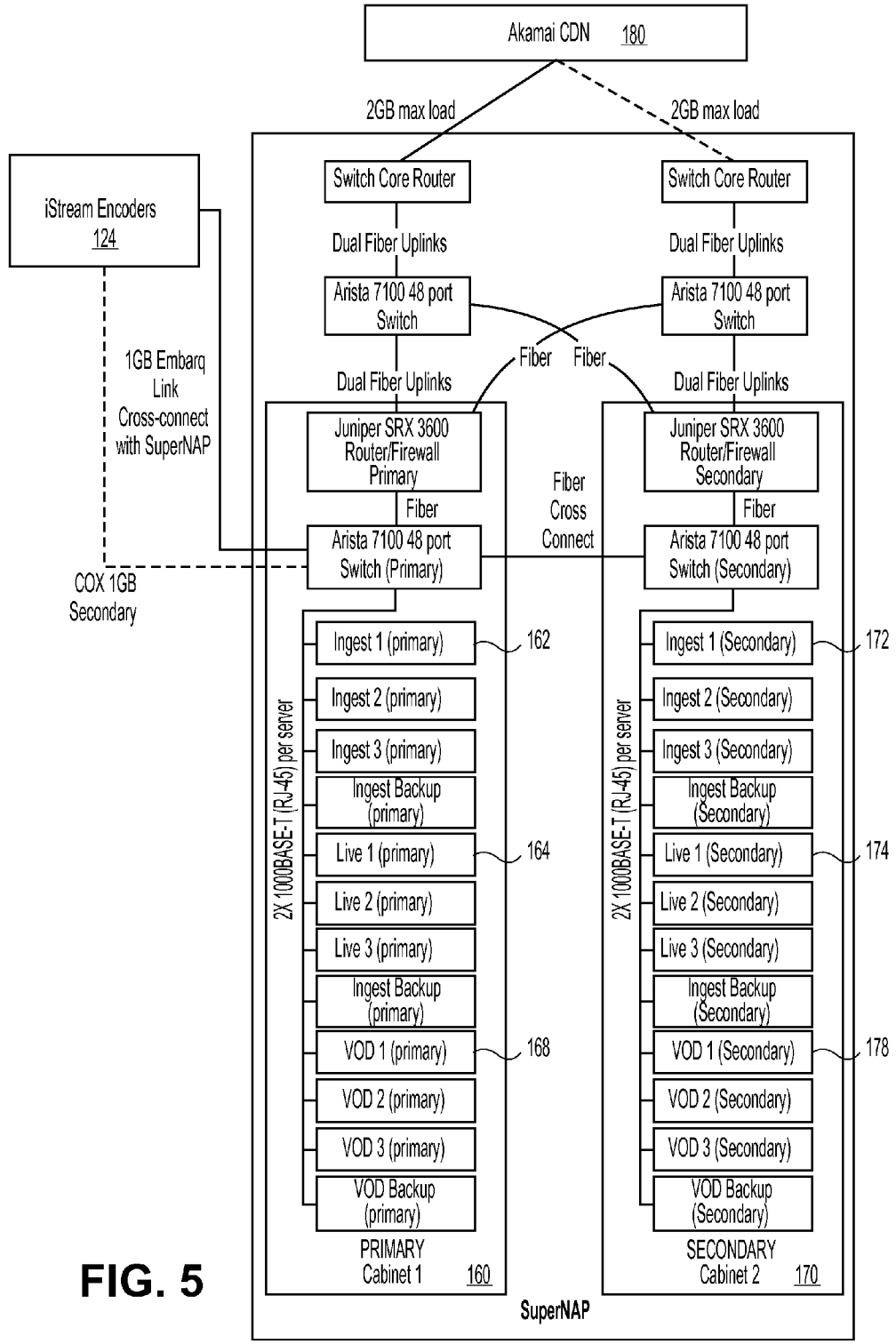
FIG. 5 is a block diagram of an exemplary embodiment of the origin server architecture of FIG. 1B.

FIG. 5 is a block diagram of an exemplary embodiment of the origin server architecture of FIG. 1B. The origin server architecture of FIG. 5 illustrates the encoders 124 feeding the encoded video over a cross connect to a data center with multiple publishing resources 105 (e.g., SuperNAP data center) configured in multiple cabinets. The embodiment depicted in FIG. 5 is merely one example of a configuration of a data center containing the origin servers. The multiple servers include the primary origin server 160 and the secondary origin servers 170. The origin servers 160 also include the three server pods described in FIG. 1B, each having an ingest server 162, a live server 164, a delayed server 166, and a VOD server 168, as well as the secondary servers 172-178. The cabinets may also include a primary switch (e.g., Arista 7100 48 port switch), a secondary switch, primary and secondary router/firewalls (e.g., Juniper SRX3600), primary and secondary dual fiber uplinks to connection to switches and routers coupled to the CDN 180. The embodiment illustrated in FIG. 5 is one example of an origin server architecture that can be used in the network architecture having the VWAP 130. Alternatively, other configurations with more or less components may be used as would be appreciated by one of ordinary skill in the art having the benefit of this disclosure.

Figure 9:
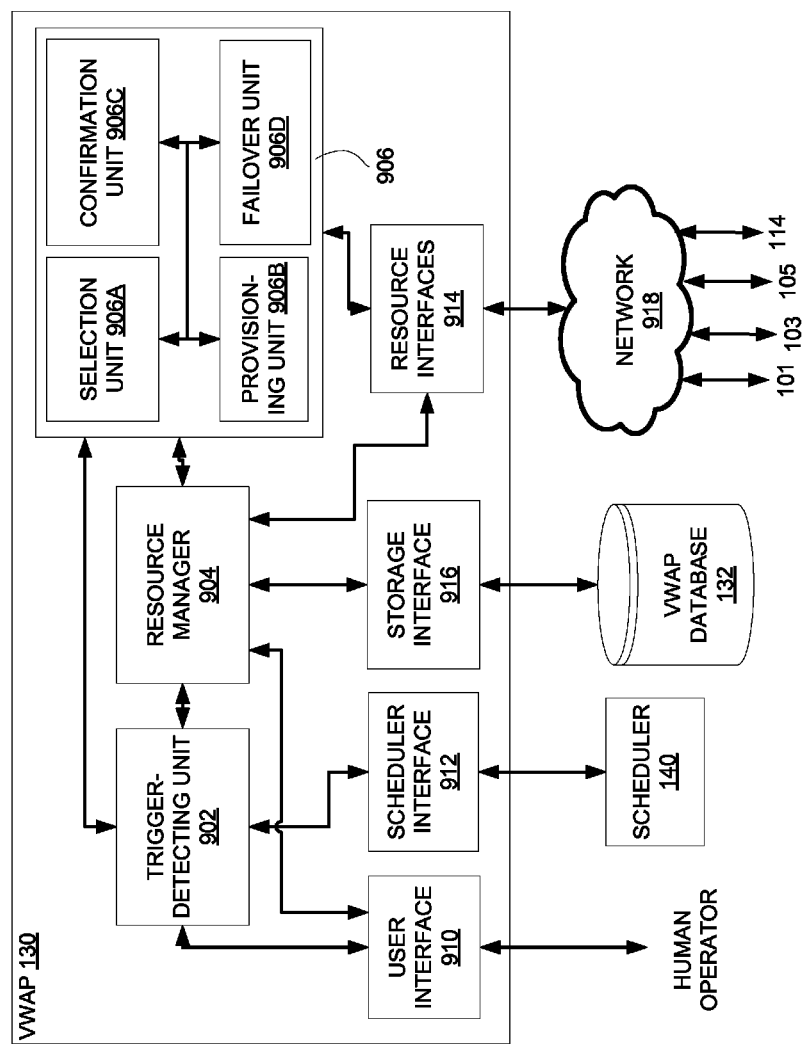
FIG. 9 illustrates a block diagram of the VWAP of FIG. 1A according to one embodiment.

FIG. 9 illustrates a block diagram of the VWAP of FIG. 1A according to one embodiment. The VWAP 130 includes a trigger-detecting unit 902, a resource manager 904, and a resource allocation and provisioning unit 906, each coupled to one another. The trigger-detecting unit 902, resource manager 904, and resource allocation and provisioning unit 906 may be integrated in hardware, software, firmware, or any combination thereof. The trigger-detecting unit 902 is configured to receive start triggers to acquire, encode, and publish a live video feed for delivery to multiple client devices over the Internet, as well as stop triggers. In one embodiment, the trigger-detecting unit 902 receives the start and stop triggers from a human operator over the user interface 910. In another embodiment, the trigger-detecting unit 902 receives the start and stop triggers from the scheduler 140 over the scheduler interface 912. The resource manager 904 is configured to track the states of the content acquisition resources 101, the encoding resources 103, and the publishing resources 105 in the VWAP database 132. In one embodiment, the resource manager 904 tracks the states of the resources, such as when the resource is one of the currently being used, current not being used, and currently failed states, and maintains the states of the resources in the VWAP database 132. In another embodiment, the resource manager 904 is configured to detect if a resource has failed. For example, upon failure by the resource allocation and provisioning unit 906 fails to provision one of the resources, the resource allocation and provisioning unit 906 can notify the resource manager 904 of the failed state of the resource. The resource manager 904 updates the state of the resource in the VWAP database 132. Once the failed resource has been corrected, such as by a human operator of the VWAP 130, the resource manager 904 can update the state of the resource in the VWAP database 132.

The resource allocation and provisioning unit 906, in response to the trigger-detecting unit 902 receiving the trigger, is configured to automatically select one of the content acquisition resources 101 that is not currently being used, one of the encoding resources 103 that is not currently being used, and one of the publishing resources 105 that is currently not being used using the resource manager 904. In another embodiment, the resource allocation and provisioning unit 906 can directly access the VWAP database 132 by way of the storage interface 132 to select the resources 132 without using the resource manager 904. Also, in response to the trigger, the resource allocation and provisioning unit 906, via resource interfaces 9414, communicates with the selected content acquisition resource 101 to provision the selected content acquisition resource 101 to acquire raw video of the live video feed from a video content source, with the selected encoding resource 103 to provision the selected encoding resource 103 to encode the raw video, with a video router 114 to provision the video router 114 to route the raw video from the selected content acquisition resource 101 to the selected encoding resource 103, with the selected publishing resource 105 to provision the selected publishing resource 105 to publish the encoded video on the Internet, and with the selected encoding resource 103 to provision the selected encoding resource 103 to route the encoded video to the selected publishing resource 105.

In one embodiment, the resource allocation and provisioning unit 906 includes a selection unit 906A configured to automatically select different ones of the resources, and a provisioning unit 906B to automatically cause the provisioning of the selected resources. In another embodiment, the resource allocation and provisioning unit 906 also includes a confirmation unit 906C configured to confirm the provisioning performed by the provisioning unit 906B. For example, the confirmation unit 906C may be configured to confirm whether the video is routed properly, whether the publishing points are provisioned, and whether the publishing points are receiving and transmitting the video feed, such as described with respect to blocks 230, 234, 238, and 240 of FIG. 2A. The provisioning unit 906C may also be configured to confirm whether resources have been stopped, such as described with respect to blocks 256, 262, and 266 of FIG. 2B, blocks. Alternatively, the confirmation unit 906C may confirm the completion of operations before completing other operations. In another embodiment, the resource allocation and provisioning unit 906 also includes a failover unit 906D configured to perform one or more failover operations, such as those described above with respect to FIGS. 3A and 3B, when one of the resources has failed.

In another embodiment, the trigger-detecting unit 902 receives a trigger (from the human operator or the scheduler 140) to encode the video feed once and to publish the video feed to a set of two or more publishing resources for delivery of the video feed in different formats over the Internet. As described herein, different ones of the client devices coupled to the Internet may require different ones of the different formats. In this embodiment, the resource allocation and provisioning unit 906, in response to the trigger-detecting unit 902 receiving the trigger, is configured to communicate, via resource interfaces 914, with a content acquisition resource 101 to provision the content acquisition resource 101 to acquire raw video of the live video feed from a video content source, with an encoding resource 103 to provision the encoding resource 103 to encode the raw video, and to automatically select a first and second ones of the set of publishing resources 105 that are not currently being used. Also, in response to the trigger, the resource allocation and provisioning unit 906, via resource interfaces 914, communicates with the first selected publishing resource 105 to provision the first selected publishing resource 105 to publish the encoded video in a first one of the different formats for delivery over the Internet, with the second selected publishing resource 105 to provision the second selected publishing resource 105 to publish the encoded video in a second one of the different formats for delivery over the Internet, and with the encoding resource 103 to provision the encoding resource 103 to route the same encoded video to the first selected publishing resource 105 and the second selected publishing resource 105.

In one embodiment, the resource interfaces 914 include a content acquisition resource to communicate with the content acquisition resources, an encoding resource interface to communicate with the encoding resources 103, a video router interface to communicate with the video router 114, and a publishing resource interface to communication with the publishing resources 105. The VWAP 130 communicates with the resources 101, 103, 105, and 114 over a network 918. The network 918 may be a private network, such as a LAN, or a public network, such as the Internet, or any combination thereof.

In another embodiment, the VWAP 130 of FIG. 9 further includes the input interface 910 to receive input from a human operator of the VWAP. For example, the human operator can input information regarding the resources, such as described with respect to FIGS. 7A-7L. The resource allocation and provisioning unit 906 can store this information in the VWAP database 132 using the storage interface 916. Alternatively, the user interface 910 can allow the human operator to store the information directly into the VWAP database 916 through the storage interface without the use of the resource allocation and provisioning unit 906.

The embodiments described herein may provide the following advantages and benefits. The embodiments described herein may solve issues with dynamic resources allocation, which may include allocation of receivers, decoders, and encoders. For example, in order to not exceed the network lines throughput (e.g., OC-12 throughput), the embodiments described herein provide a way to manage resources based on what video feed needed to be encoded at a particular data and time. For example, during the Vancouver Olympics the resources could not run all twenty-three feeds continuously because it would exceed the OC-12 throughput. The VWAP 130 keeps records of all decoders, receivers and encoders, as well as all video/audio subscription information, encoder profiles and publishing points in VWAP database 132. The VWAP 130 includes logic that tracks what resource is available at any point in time and only send requests to subscribe to particular video feed, in case of decoders or receivers, to available decoders/receivers (i.e., decoders/receivers not currently in use or failed) or send encoder profile and publishing point information to available encoders.

The embodiments described herein can also be used to start and stop live webcasts. In order for live video feed to be encoded and pushed to the publishing point for delivery over the Internet, the VWAP 130 performs a number of steps with checks and retry logic in place to control processes, handle errors and to prevent mistimed display of the video (e.g., encoder starts encoding video prior to correct video been routed to the encoder). The VWAP 130 includes logic, such as that described with respect to FIG. 2A to handle the starting the webcasts of one or more video feeds, and to handle two or more webcasts that start at the same time or approximately at the same time. Similarly, the VWAP 130 includes logic, such as that described with respect to FIG. 2B to handle stopping the webcasts and releasing the resources to be used for other video feeds.

The embodiments described herein can allow the content owners to share the same content acquisition resource, but route the video from the shared content acquisition resource 101 to one encoder belonging to the first content owner with any specification (e.g., format, encoding profile, with slates or no slates, etc), and, at the same time, routing it to a second encoder belong to a second content owner with different specifications. Slates can be used to overlay content over broadcast advertisements that are not permitted for webcasting. The embodiments described herein allow the sharing of resources between different VWAP users (e.g., different clients). In some embodiments, the VWAP 130 can coordinate the resources for acquiring, encoding, and publishing the video in a single format for one or more client devices. In other embodiments, the VWAP 130 can also coordinate the resources for acquiring, encoding, and publishing the video in multiple formats for multiple client devices, such as when the client devices support different formats. In these embodiments, the VWAP 130 can allow the content owner to share the same content acquisition resource and the same encoding resource, and establish multiple publishing resources for publishing the encoded video in different formats (e.g., IIS streaming, Apple HTTP segmented, etc.) for each publishing resource. Unlike conventional solutions that use multiple encoders to publish the video in multiple formats, one encoder for each format, the embodiments described herein may share resources to provide dynamic-multi-format support. This is more efficient than conventional solutions, less prone to errors, and can scale easily compared to conventional solutions.

The embodiments described herein can provide a mechanism for live-to-VOD transitions. For example, the redirecting .302 files can transition viewers transparently from the live or delayed streams to a VOD stream, for example. The VWAP 130 includes logic to perform the live-to-VOD transition as described above, as well as to move files to designated locations and update the CMS with the new URLs to redirect the viewers transparently.

The embodiments described herein can provide failover, such as encoder failover described with respect to FIG. 3A, and decoder/receiver failover described with respect to FIG. 3B.

The embodiments described herein provide scalability. The VWAP 130 includes logic that allows for control of scheduling, acquisition, routing, encoding, publishing point management, resource management for multiple types of client devices, as well as multiple formats. Since VWAP 130 performs the video workflow automatically, the VWAP 130 is less prone to human error, especially when setting up multiple video feeds and when multiple video feeds start at the same time or approximately at the same time. In addition, the embodiments described herein allow a single computing system, executing the VWAP, to handle a large amount of video feeds, some of which could be starting at the same time. The single computing system can control all of the different resources at the same time for many different video feeds.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method, implemented by a computing system programmed to perform operations, comprising:
    receiving a start trigger, at a video workflow automation platform (VWAP) executing on the computing system, to encode a video feed once to publish the video feed to a set of two or more publishing resources for delivery of the video feed in a plurality of different formats over the Internet, and to immediately start the video feed, wherein different ones of a plurality of client devices coupled to the Internet require different ones of the plurality of different formats;
    in response to the start trigger at a time of starting the video feed, the VWAP performing the following, communicating with a content acquisition resource to provision the content acquisition resource to acquire raw video of the video feed from a video content source, communicating with an encoding resource to provision the encoding resource to encode the raw video,
    automatically without human interaction selecting a first and second ones of the set of publishing resources that are not currently being used, wherein the first selected publishing resource includes a first set of one or more origin servers and the second selected publishing resource includes a second set of one or more origin servers,
    communicating with the first selected publishing resource to provision the first selected publishing resource to publish the encoded video in a first one of the plurality of formats before the encoded video in the first format is delivered over the Internet via a delivery network,
    communicating with the second selected publishing resource to provision the second selected publishing resource to publish the encoded video in a second one of the plurality of formats before the encoded video in the second format is delivered over the Internet via the delivery network, and communicating with the encoding resource to provision the encoding resource to route the same encoded video to the first selected publishing resource and the second selected publishing resource.

2. The method of claim 1, wherein said VWAP further performing the following in response to said trigger, communicating with a video router to provision the video router to route the raw video from the content acquisition resource to the encoding resource.

3. The method of claim 1, further comprising monitoring the plurality of publishing resources, comprising tracking, in a VWAP database associated with the VWAP, a publishing status of each of the plurality of publishing resources, wherein the publishing status indicates that the respective acquisition resource is in one of a plurality of states, wherein the plurality of states comprises currently being used, currently failed, and currently not being used.

4. The method of claim 1, wherein:
the video content source is an Internet Protocol (IP) multicast source, the content acquisition resource is a decoder,
said communicating with the decoder comprises sending instructions to the decoder to configure the decoder to subscribe to the video feed, wherein the video feed is a IP multicast feed from the IP multicast source, and
said VWAP further performing the following in response to said trigger determining an input port of the video router that is coupled to the decoder and an output port that is coupled to the encoding resource, and said communicating with the video router comprises sending instructions to the video router to configure the video router to route the raw video between the input and output ports.

5. The method of claim 4, wherein the encoding resource is a video encoder, and wherein said communicating with the video encoder comprises sending instructions to the selected video encoder to configure the video encoder to receive the raw video from the output of the decoder.

6. The method of claim 5, wherein said communicating with the video encoder comprises sending instructions to the video encoder to configure the video encoder to output the video feed to the first and second sets of origin servers.

7. The method of claim 1, wherein:
the video content source is a satellite,
the content acquisition resource is a receiver,
said communicating with the receiver comprises sending instructions to the video encoder to configure the receiver to subscribe to the video feed received by a satellite dish over a satellite link,
said VWAP further performing the following in response to said trigger determining an input port of the video router that is coupled to the receiver and an output port that is coupled to the encoding resource, and said communicating with the video router comprises sending instructions to the video router to configure the video router to route the raw video between the input and output ports.

8. The method of claim 7, wherein the encoding resource is a video encoder, and wherein said communicating with the video encoder comprises sending instructions to the selected video encoder to configure the video encoder to receive the raw video from the output of the receiver.

9. The method of claim 8, wherein said communicating with the video encoder comprises sending instructions to the video encoder to configure the video encoder to output the video feed to the first and second sets of origin servers.

10. The method of claim 1, wherein said VWAP further performing the following in response to the trigger, confirming whether each of the first and second selected publishing resources is receiving the encoded video from the encoding resource and is transmitting the encoded video, if the respective publishing resource is not receiving or transmitting, automatically selecting a different one of the plurality of publishing resources that is not currently being used, communicating with the selected different publishing resource to provision the selected publishing resource to publish the encoded video on the Internet, and communicating with the encoding resource to provision the encoding resource to route the encoded video to the selected different publishing resource, and if the respective publishing resource is receiving and transmitting, extracting an actual start time of the video feed from at least one of the selected encoding resource and the selected publishing resource, and posting a successful start of the video feed and the actual start time of the video feed.

11. The method of claim 1, wherein said VWAP further performing the following in response to the trigger, confirming whether the raw video is acquired by the content acquisition resource, and if the raw video is not properly acquired, automatically selecting a different content acquisition resource that is not currently being used, and communicating with the selected different content acquisition resource to provision the selected different content acquisition resource to acquire the video feed.

12. The method of claim 1, wherein said VWAP further performing the following in response to the trigger, confirming whether each of the first and second selected publishing resources is provisioned, and if the respective publishing resource is not properly provisioned, automatically selecting a different one of the publishing resources that is not currently being used, and communicating with the selected different publishing resource to provision the selected different publishing resource to publish the video feed.

13. The method of claim 1, wherein said VWAP further performing the following in response to the trigger, confirming whether the encoding resource is started, and if the encoding resource is not started, automatically selecting a different encoding resource that is not currently being used, and communicating with the selected different encoding resource to provision the selected different encoding resource to encode the raw video.

14. The method of claim 1, further comprising:
receiving a second trigger, at the VWAP to stop acquiring, encoding, and publishing the video feed; and
in response to the second trigger, the VWAP performing the following,
communicating with the content acquisition resource to unsubscribe to the video feed,
communicating with the encoding resource to stop encoding the raw video, communicating with a video router to terminate the router connection between the content acquisition resource and the encoding resource,
communicating with the first and second selected publishing resources to instruct the first and second selected publishing resources to move files to a video-on-demand (VOD) directory,
creating a redirecting file to shift publishing points of the first and second selected publishing resources to a VOD publishing point, and
posting a successful stop of the video feed.

15. The method of claim 1, wherein:
said communicating with the first selected publishing resources comprises sending instructions to the first selected publishing resource to configure the first selected publishing resource to package the encoded video according to the first format; and said communicating with the second selected publishing resources comprises sending instructions to the second selected publishing resource to configure the second selected publishing resource to package the encoded video according to the second format.

16. The method of claim 1, wherein said communicating with the first selected publishing resource comprises sending instructions to the first selected publishing resource to configure the first selected publishing resource to transcode the encoded video into the first format.

17. An apparatus, comprising a computing system to execute a video workflow automation platform (VWAP) that causes the acquisition, encoding, publishing and immediate starting of video feeds for delivery to a plurality of client devices over the Internet, the VWAP comprising:
a plurality of resource interfaces configured to communicate with a content acquisition resource, an encoding resource, and a plurality of publishing resources, each of the publishing resources includes a set of one or more origin servers;
a trigger-detecting unit to receive a start trigger to encode one of the video feeds once and to publish the one video feed to a set of two or more publishing resources for delivery of the one video feed in a plurality of different formats over the Internet, wherein different ones of the plurality of client devices coupled to the Internet require different ones of the plurality of different formats; and
a resource allocation and provisioning unit, coupled to the trigger-detecting unit and the plurality of resource interfaces, wherein the resource allocation and provisioning unit, in response to the start trigger at a time of starting the video feed, is operative, automatically cause the provisioning of,
the content acquisition resource to acquire raw video of the one video feed from a video content source and to route the same encoded video to the set of publishing resources, and
the encoding resource to encode the raw video, and,
automatically without human interaction select and automatically cause the provisioning of, a first one of the set of publishing resources to publish the encoded video in a first one of the plurality of formats before the encoded video in the first format is delivered over the Internet via a delivery network, and
a second one of the set of publishing resources to publish the encoded video in a second one of the plurality of formats before the encoded video in the second format is delivered over the Internet via the delivery network.

18. The apparatus of claim 17, wherein the resource allocation and provisioning unit is further configured to communicate with a video router to provision the video router to route the raw video from the content acquisition resource to the encoding resource.

19. The apparatus of claim 17, wherein the VWAP further comprises: an input interface to receive input from a human operator of the VWAP; and
a storage interface to communicate with the database.

20. The apparatus of claim 17, wherein the VWAP further comprises:
a scheduler interface to communicate with a scheduler, wherein the scheduler maintains a schedule of the video feeds, and wherein a plurality of the video feeds start at the same time or approximately at the same time, wherein the trigger-detecting unit is configured to receive a plurality of triggers for the plurality of video feeds that start at the same time or approximately at the same time over the scheduler interface from the scheduler; and
a storage interface to communicate with the database.

21. The apparatus of claim 18, wherein the resource allocation and provisioning unit comprises:
a confirmation unit configured to confirm said provisioning of the content acquisition resource, encoding resource, the plurality of publishing resources, and the video router; and
a failover unit coupled to the confirmation unit configured to perform a failover operation when one of the content acquisition resource, encoding resource, the plurality of publishing resources, and the video router fails.

22. The apparatus of claim 17, wherein the resource allocation and provisioning unit is further configured to communicate with the first publishing resource to provision the first publishing resource to transcode the encoded video into the first format.

23. A non-transitory computer-readable storage medium storing instruction thereon when executed by a computing system cause the computing system to perform a method, comprising:
receiving a start trigger, at a video workflow automation platform (VWAP) executing on the computing system, to encode a video feed once, to publish the video feed to a set of two or more publishing resources for delivery of the video feed in a
plurality of different formats over the Internet, and to immediately start the video feed, wherein different ones of a plurality of client devices coupled to the Internet require different ones of the plurality of different formats;
in response to the start trigger at a time of starting the video feed, the VWAP performing the following,
communicating with a content acquisition resource to provision the content acquisition resource to acquire raw video of the video feed from a video content source,
communicating with an encoding resource to provision the encoding resource to encode the raw video,
automatically without human interaction selecting a first and second ones of the set of publishing resources that are not currently being used, wherein the first selected publishing resource includes a first set of one or more origin servers and the second selected publishing resource includes a second set of one or more origin servers,
communicating with the first selected publishing resource to provision the first selected publishing resource to publish the encoded video in a first one of the plurality of formats before the encoded video in the first format is delivered over the Internet via a delivery network
communicating with the second selected publishing resource to provision the second selected publishing resource to publish the encoded video in a second one of the plurality of formats before the encoded video in the second format is delivered over the Internet via the delivery network, and communicating with the encoding resource to provision the encoding resource to route the same encoded video to the first selected publishing resource and the second selected publishing resource.

24. The non-transitory computer-readable storage medium of claim 23, wherein said VWAP further performing the following in response to said trigger, communicating with a video router to provision the video router to route the raw video from the content acquisition resource to the encoding resource.

25. The non-transitory computer-readable storage medium of claim 23, wherein the method further comprises:

receiving a second trigger, at the VWAP to stop acquiring, encoding, and publishing the video feed; and in response to the second trigger, the VWAP performing the following, communicating with the content acquisition resource to unsubscribe to the video feed, communicating with the encoding resource to stop encoding the raw video, communicating with a video router to terminate the router connection between the content acquisition resource and the encoding resource, communicating with the first and second selected publishing resources to instruct the first and second selected publishing resources to move files to a video-on-demand (VOD) directory, creating a redirecting file to shift publishing points of the first and second selected publishing resources to a VOD publishing point, and posting a successful stop of the video feed.

26. The non-transitory computer-readable storage medium of claim 23, wherein:

said communicating with the first selected publishing resources comprises sending instructions to the first selected publishing resource to configure the first selected publishing resource to package the encoded video according to the first format; and said communicating with the second selected publishing resources comprises sending instructions to the second selected publishing resource to configure the second selected publishing resource to package the encoded video according to the second format.

27. The non-transitory computer-readable storage medium of claim 23, wherein said communicating with the first selected publishing resource comprises sending instructions to the first selected publishing resource to configure the first selected publishing resource to transcode the encoded video into the first format.

* * * * *